(12) United States Patent
Kawamura

(10) Patent No.: US 10,608,422 B2
(45) Date of Patent: Mar. 31, 2020

(54) LOCK STRUCTURE, ELECTRIC CONNECTION BOX AND WIRE HARNESS

(71) Applicant: Yazaki Corporation, Tokyo (JP)

(72) Inventor: Yukihiro Kawamura, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/431,013

(22) Filed: Jun. 4, 2019

(65) Prior Publication Data

US 2019/0379194 A1 Dec. 12, 2019

(30) Foreign Application Priority Data

Jun. 7, 2018 (JP) ................................ 2018-109343

(51) Int. Cl.
| | |
|---|---|
| *H02G 3/16* | (2006.01) |
| *H05K 5/02* | (2006.01) |
| *B60R 16/02* | (2006.01) |
| *H02G 3/08* | (2006.01) |
| *H02G 3/14* | (2006.01) |
| *B60R 16/023* | (2006.01) |
| *H01R 13/436* | (2006.01) |

(52) U.S. Cl.
CPC ........... *H02G 3/16* (2013.01); *B60R 16/0207* (2013.01); *B60R 16/0238* (2013.01); *H01R 13/4362* (2013.01); *H02G 3/081* (2013.01); *H02G 3/088* (2013.01); *H02G 3/14* (2013.01); *H05K 5/02* (2013.01)

(58) Field of Classification Search
CPC ........ H05K 5/0221; H02G 3/08; H02G 3/081; H02G 3/086; H02G 3/088
See application file for complete search history.

(56) References Cited

U.S. PATENT DOCUMENTS

| | | | |
|---|---|---|---|
| 2012/0043104 A1* | 2/2012 | Takeuchi ............ | B60R 16/0238 174/50 |
| 2014/0083732 A1* | 3/2014 | Shibata ............... | B60R 16/0238 174/50 |
| 2014/0083733 A1* | 3/2014 | Kamigaichi ........ | B60R 16/0239 174/50 |

(Continued)

FOREIGN PATENT DOCUMENTS

| | | |
|---|---|---|
| EP | 2 448 076 A2 | 5/2012 |
| JP | 2013-90407 A | 5/2013 |

(Continued)

*Primary Examiner* — Hoa C Nguyen
*Assistant Examiner* — Amol H Patel
(74) *Attorney, Agent, or Firm* — Kenealy Vaidya LLP

(57) ABSTRACT

A lock structure includes an engaged body; and an engaging body capable of inserting and removing the engaged body along insertion and removal directions opposite to each other. An engaged body has a drainage space surrounded by inner wall surfaces of first and second engaged walls and third and fourth engaged walls disposed opposite to each other at an interval, an engaged protrusion protruding from an outer wall surface of the second engaged wall. An engaging body has an accommodation space that is an internal space surrounded by inner wall surfaces of first and second engaging walls and third and fourth engaging walls disposed opposite to each other at an interval and in which the engaged body is accommodated.

10 Claims, 15 Drawing Sheets

(56) References Cited

U.S. PATENT DOCUMENTS

| | | | |
|---|---|---|---|
| 2014/0131061 A1* | 5/2014 | Hirasawa | H02G 3/088 |
| | | | 174/50 |
| 2014/0151112 A1 | 6/2014 | Makino et al. | |
| 2015/0029686 A1 | 1/2015 | Shimizu et al. | |
| 2017/0070040 A1* | 3/2017 | Kawada | H02G 3/088 |
| 2017/0201079 A1* | 7/2017 | Shiraki | B60R 16/02 |
| 2017/0207614 A1 | 7/2017 | Shiraki | |
| 2019/0202381 A1* | 7/2019 | Steffka | H02G 3/16 |
| 2019/0288419 A1* | 9/2019 | Matsuoka | H05K 1/18 |

FOREIGN PATENT DOCUMENTS

| | | |
|---|---|---|
| JP | 2014-108038 A | 6/2014 |
| JP | 2016-25802 A | 2/2016 |
| WO | 2013/129132 A1 | 9/2013 |

* cited by examiner

LOCK STRUCTURE, ELECTRIC CONNECTION BOX AND WIRE HARNESS

CROSS-REFERENCE TO RELATED APPLICATION(S)

The present application claims priority to and incorporates by reference the entire contents of Japanese Patent Application No. 2018-109343 filed in Japan on Jun. 7, 2018.

BACKGROUND OF THE INVENTION

1. Field of the Invention

The present invention relates to a lock structure, an electric connection box and a wire harness.

2. Description of the Related Art

In the related art, there is known a lock structure for keeping two components to be assembled in an assembled state (Japanese Patent Application Laid-open No. 2016-25802 and Japanese Patent Application Laid-open No. 2014-108038). The lock structure is applied to, for example, an electric connection box which accommodates electronic components, and an electric connection box which accommodates the electronic components and electric wires and forms a wire harness together with the electric wires drawn outward. In the electric connection box, two fitting members for fitting the peripheral edge portions of an opening are provided as constituent components of a housing. In the electric connection box, a lock structure is used to keep the two fitting members in a fitted state. The lock structure includes an engaged body provided on one of the two fitting members, and an engaging body provided on the other thereof. The lock structure holds the two fitting members in the fitted state by engaging the engaged body and the engaging body with each other when the two fitting members are fitted together.

Incidentally, in the electric connection box, various measures have been taken to suppress entry of liquid such as water to the inside of the housing. The measures should be taken not only in the fitting parts of the two fitting members, but also in the lock structure if a gap or the like between the engaged body and the engaging body is continuous with the inside of the housing. Therefore, it is desirable that the lock structure can suppress the entry of the liquid into the gap or the like between the engaged body and the engaging body, and can suppress the entry of the liquid into the inside of the housing via the gap or the like.

SUMMARY OF THE INVENTION

Therefore, an object of the present invention is to provide a lock structure, an electric connection box and a wire harness which can suppress the entry of liquid.

In order to achieve the above mentioned object, a lock structure according to one aspect of the present invention includes an engaged body; and an engaging body capable of inserting and removing the engaged body along insertion and removal directions opposite to each other, and capable of locking the inserted engaged body in the insertion direction and the removal direction, respectively, wherein the engaged body includes first and second engaged walls disposed opposite to each other at an interval in an orthogonal direction to the insertion and removal directions, third and fourth engaged walls disposed opposite to each other at an interval in an orthogonal direction to the insertion and removal directions and an opposite arrangement direction of the first and second engaged walls, a drainage space surrounded by respective inner wall surfaces of the first to fourth engaged walls, an engaged protrusion protruding from an outer wall surface of the second engaged wall, a first communication port through which the drainage space communicates with the outside on the insertion direction side of the engaged protrusion, and a second communication port through which the drainage space communicates with the outside on the removal direction side of the first communication port, and the engaging body includes first and second engaging walls disposed opposite to each other at an interval in the opposite arrangement direction, third and fourth engaging walls disposed opposite to each other at an interval in the orthogonal direction to the insertion and removal directions and the opposite arrangement direction, an accommodation space that is an internal space surrounded by respective inner wall surfaces of the first to fourth engaging walls and in which the engaged body is accommodated, an insertion port through which the engaged body is inserted into the accommodation space from a tip of an end portion on the insertion direction side, a locking hole that is a penetration hole provided in the second engaging wall and into which the engaged protrusion is inserted when the engaged body is accommodated in the accommodation space, and a communication port through which the accommodation space communicates with the outside on the insertion direction side of the locking hole.

According to another aspect of the present invention, in the lock structure, it is desirable that the locking hole is a penetration hole connected to the communication port.

According to still another aspect of the present invention, in the lock structure, it is desirable that the first communication port and the second communication port are disposed opposite to each other in the insertion and removal directions.

According to still another aspect of the present invention, in the lock structure, it is desirable that the engaged body is provided on an outer wall surface side of a peripheral wall body of a first fitting member, and forms the first engaged wall, using a part of the peripheral wall body of the first fitting member, and the engaging body is provided on a first peripheral wall body and a second peripheral wall body of a second fitting member sandwiching an opening peripheral edge portion of the peripheral wall body of the first fitting member, forms the first engaging wall, using a part of the first peripheral wall body having an opening peripheral edge portion disposed opposite to the inner wall surface of the opening peripheral edge portion of the peripheral wall body, and forms the second engaging wall, using a part of the second peripheral wall body having an opening peripheral edge portion disposed opposite to the outer wall surface of the opening peripheral edge portion of the peripheral wall body.

In order to achieve the above mentioned object, an electric connection box according to still another aspect of the present invention includes a housing configured to accommodate electronic components in the housing, wherein the housing has at least first and second fitting members to be fitted to each other, and has a lock structure configured to hold a fitted state of the first and second fitting members, the lock structure includes an engaged body provided on the first fitting member, and an engaging body provided on the second fitting member, capable of inserting and removing the engaged body along insertion and removal directions opposite to each other, and capable of locking the inserted engaged body in the insertion direction and the removal direction, respectively, the engaged body includes first and second engaged walls disposed opposite to each other at an interval in an orthogonal direction to the insertion and removal directions, third and fourth engaged walls disposed opposite to each other at an interval in an orthogonal direction to the insertion and removal directions and an opposite arrangement direction of the first and second engaged walls, a drainage space surrounded by respective inner wall surfaces of the first to fourth engaged walls, an engaged protrusion protruding from an outer wall surface of the second engaged wall, a first communication port through which the drainage space communicates with the outside on the insertion direction side of the engaged protrusion, and a second communication port through which the drainage space communicates with the outside on the removal direction side of the first communication port, and the engaging body includes first and second engaging walls disposed opposite to each other at an interval in the opposite arrangement direction, third and fourth engaging walls disposed opposite to each other at an interval in the orthogonal direction to the insertion and removal directions and the opposite arrangement direction, an accommodation space which is an internal space surrounded by respective inner wall surfaces of the first to fourth engaging walls and in which the engaged body is accommodated, an insertion port through which the engaged body is inserted into the accommodation space from a tip of an end portion on the insertion direction side, a locking hole which is a penetration hole provided in the second engaging wall and into which the engaged protrusion is inserted when the engaged body is accommodated in the accommodation space, and a communication port through which the accommodation space communicates with the outside on the insertion direction side of the locking hole.

In order to achieve the above mentioned object, a wire harness according to still another aspect of the present invention includes an electronic component; an electric wire electrically connected to the electronic component; and a housing configured to accommodate the electronic component and the electric wire inside and draws the electric wire outward from inside, wherein the housing has at least first and second fitting members to be fitted to each other, and has a lock structure configured to hold a fitted state of the first and second fitting members, the lock structure includes an engaged body provided on the first fitting member, and an engaging body provided on the second fitting member, capable of inserting and removing the engaged body along insertion and removal directions opposite to each other, and capable of locking the inserted engaged body in the insertion direction and the removal direction, respectively, the engaged body includes first and second engaged walls disposed opposite to each other at an interval in an orthogonal direction to the insertion and removal directions, third and fourth engaged walls disposed opposite to each other at an interval in an orthogonal direction to the insertion and removal directions and an opposite arrangement direction of the first and second engaged walls, a drainage space surrounded by respective inner wall surfaces of the first to fourth engaged walls, an engaged protrusion protruding from an outer wall surface of the second engaged wall, a first communication port through which the drainage space communicates with the outside on the insertion direction side of the engaged protrusion, and a second communication port through which the drainage space communicates with the outside on the removal direction side of the first communication port, and the engaging body includes first and second engaging walls disposed opposite to each other at an interval in the opposite arrangement direction, third and fourth engaging walls disposed opposite to each other at an interval in the orthogonal direction to the insertion and removal directions and the opposite arrangement direction, an accommodation space that is an internal space surrounded by respective inner wall surfaces of the first to fourth engaging walls and in which the engaged body is accommodated, an insertion port through which the engaged body is inserted into the accommodation space from a tip of an end portion on the insertion direction side, a locking hole that is a penetration hole provided in the second engaging wall and into which the engaged protrusion is inserted when the engaged body is accommodated in the accommodation space, and a communication port through which the accommodation space communicates with the outside on the insertion direction side of the locking hole.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
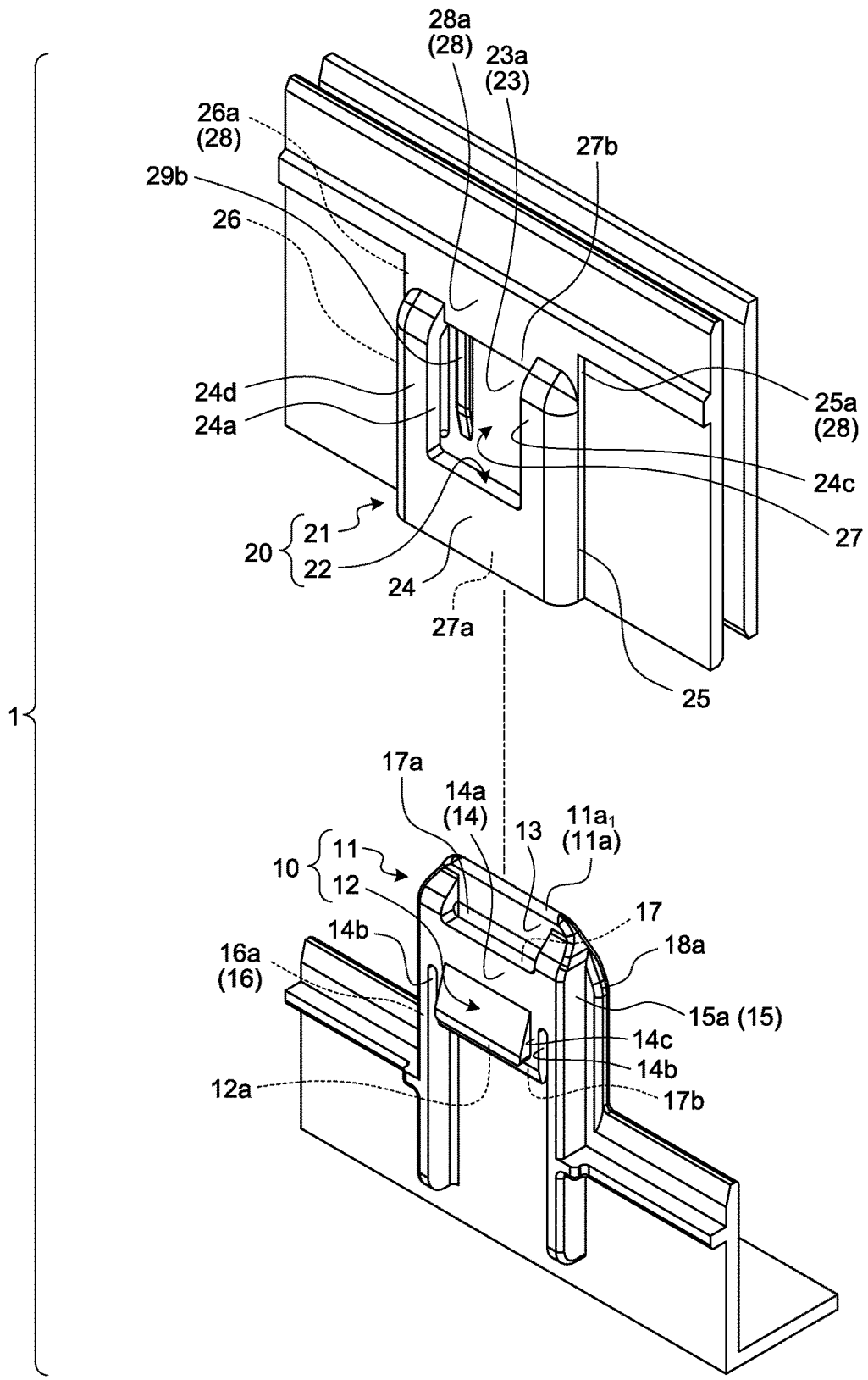
FIG. 1 is a perspective view illustrating a state before engagement of a lock structure of an embodiment.

Hereinafter, embodiments of a lock structure, an electric connection box and a wire harness according to the present invention will be described in detail on the basis of the drawings. The present invention is not limited by this embodiment.

Embodiment

One of the embodiments of the lock structure, the electric connection box and the wire harness according to the present invention will be described on the basis of FIGS. 1 to 15.

Reference numeral 1 of FIGS. 1 to 6 denotes a lock structure of this embodiment for holding two fitting members in a fitted state. The two fitting members are, for example, members for forming a housing 110 to be described later. The lock structure 1 includes an engaged body 10, and an engaging body 20 capable of inserting and removing the engaged body 10 in insertion and removal directions opposite to each other and capable of locking the inserted engaged body 10 in the insertion direction and the removal direction. The engaged body 10 and the engaging body 20 are molded of an insulating material such as a synthetic resin. In the lock structure 1, the engaged body 10 is provided on one fitting member, and the engaging body 20 is provided on the other fitting member. Incidentally, hereinafter, when simply describing as the insertion direction or the removal direction, the insertion direction or the removal direction of the engaged body 10 with respect to the engaging body 20 will be represented.

The engaged body 10 has a main body (hereinafter, referred to as an "engaged main body") 11 capable of being inserted and removed with respect to the engaging body 20, and a protrusion (hereinafter, referred to as an "engaged protrusion") 12 protruding from an outer wall surface of the engaged main body 11 (FIGS. 1 to 6).

Figure 2:
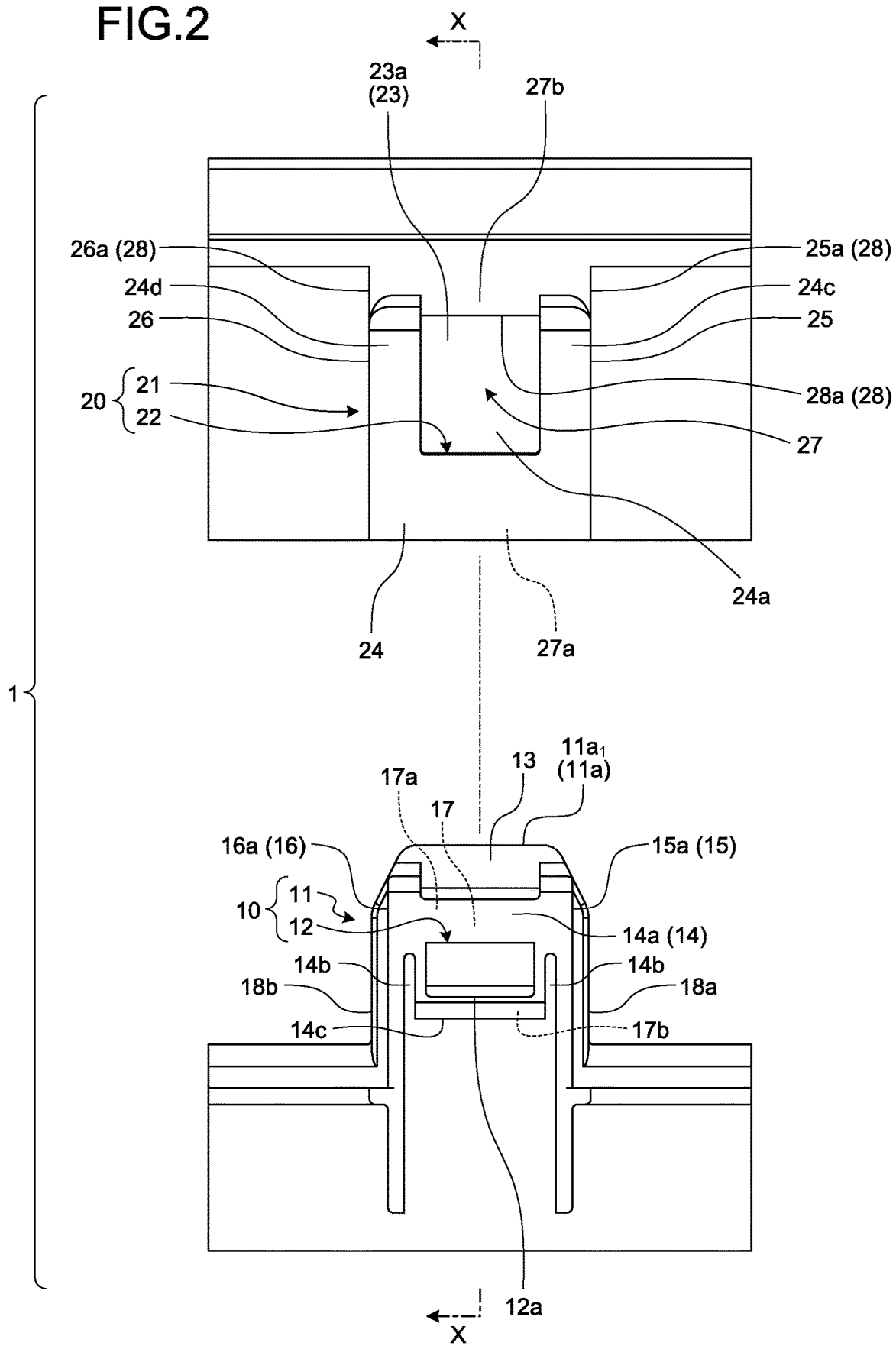
FIG. 2 is a front view illustrating a state before engagement of the lock structure of the embodiment.
Figure 3:
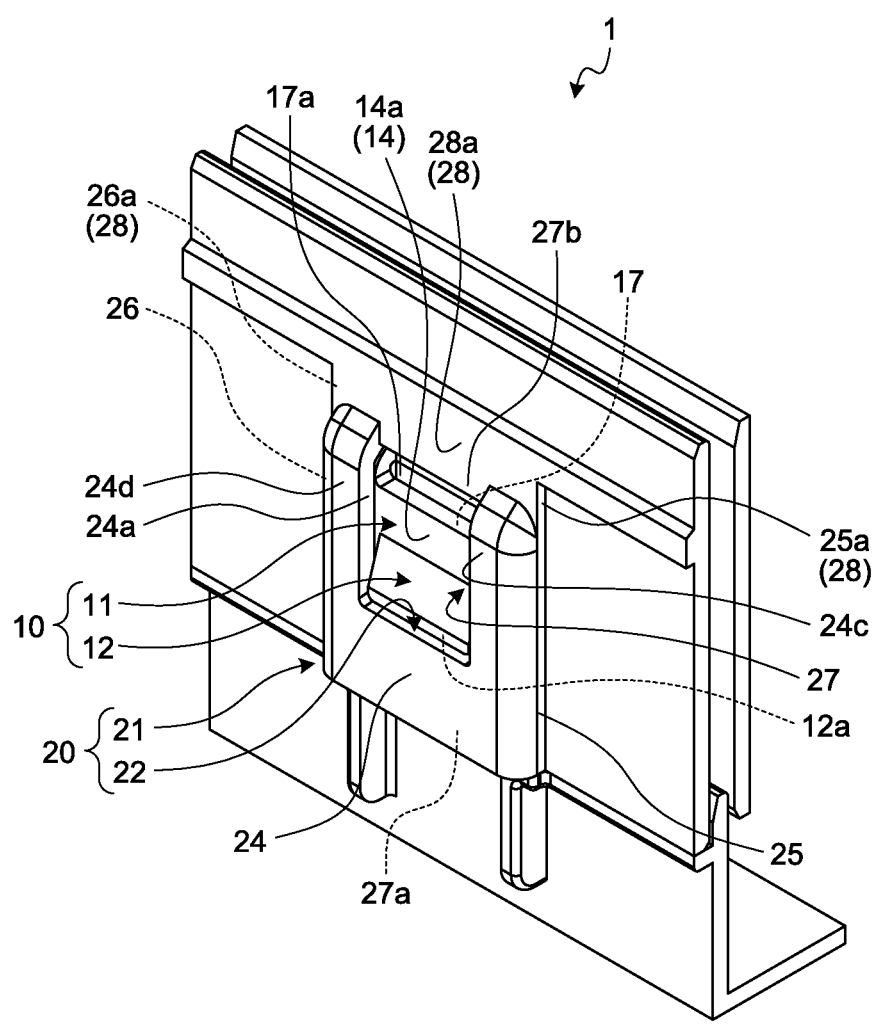
FIG. 3 is a perspective view illustrating a state after engagement of the lock structure of the embodiment.
Figure 4:
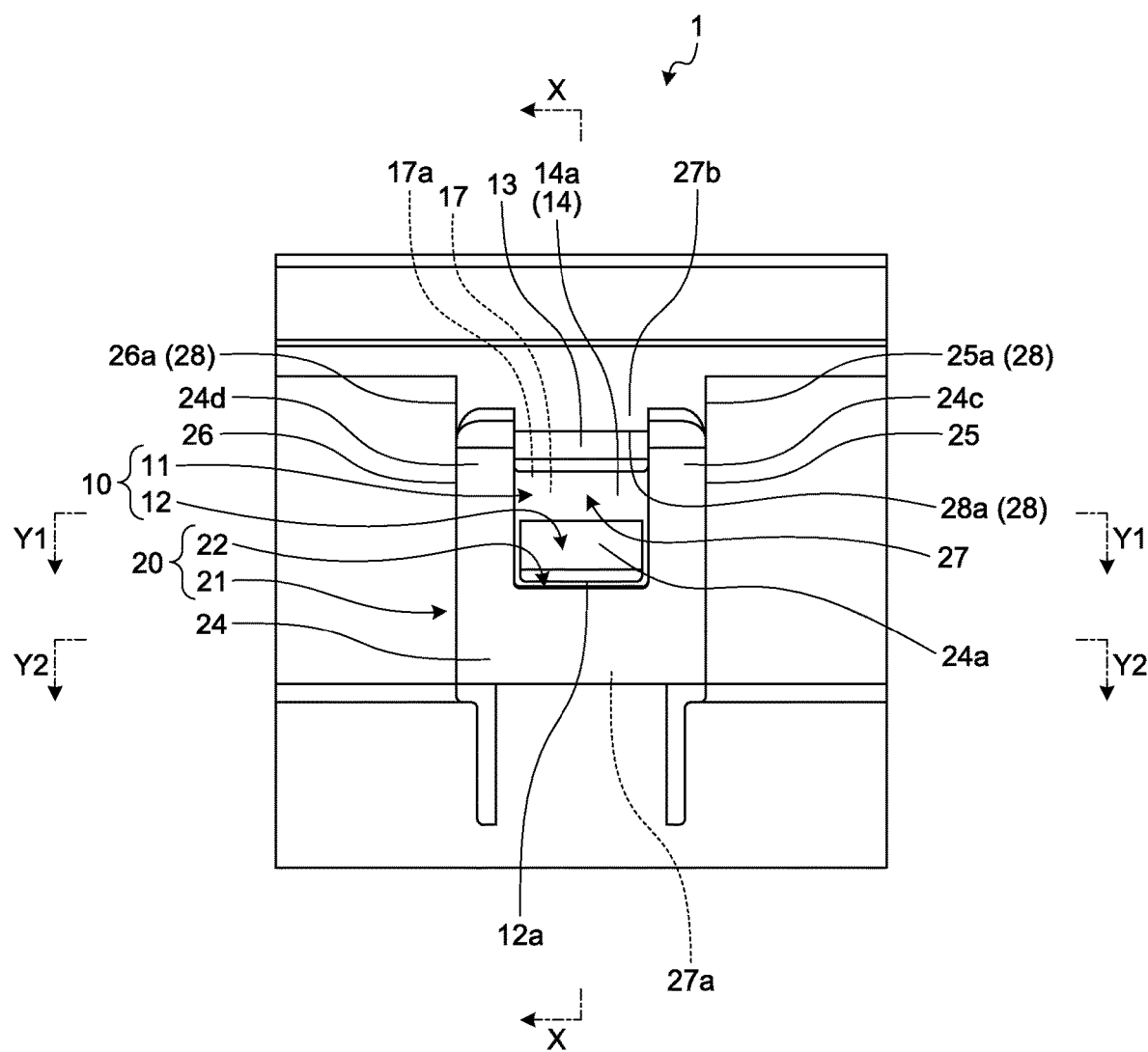
FIG. 4 is a front view illustrating a state after engagement of the lock structure of the embodiment.

The engaged main body 11 of this example has first and second walls (hereinafter, referred to as "first and second engaged walls") 13 and 14 disposed opposite to each other at an interval in an orthogonal direction to the insertion and removal directions, and third and fourth walls (hereinafter, referred to as "third and fourth engaged walls") 15 and 16 disposed opposite to each other at an interval in an orthogonal direction (hereinafter, referred to as a "width direction") to the insertion and removal directions and the opposite arrangement direction of the first and second engaged walls 13 and 14 (FIGS. 1 and 2). Further, hereinafter, when the direction is simply described as the opposite arrangement direction, the same direction as the opposite arrangement direction of the first and second engaged walls 13 and 14 will be expressed.

The first and second engaged walls 13 and 14 of this example are formed in a rectangular flat plate shape. In this example, the second engaged wall 14 is formed so that the length in the insertion and removal directions is shorter than that of the first engaged wall 13. Further, in this example, the third engaged wall 15 is provided as a connecting wall for connecting one end portions of the first engaged wall 13 and the second engaged wall 14 in the width direction, and a fourth engaged wall 16 is provided as a connecting wall for connecting the other end portions of the first engaged wall 13 and the second engaged wall 14 in the width direction. That is, the engaged main body 11 of this example is formed in a rectangular tube shape by the first to fourth engaged walls 13 to 16. Therefore, this engaged main body 11 has a square space (hereinafter, referred to as a "drainage space") 17 surrounded by the respective inner wall surfaces of the first to fourth engaged walls 13 to 16 (FIGS. 1 to 6). In this example, the space from the end surface on the insertion direction side of the second engaged wall 14 to the end surface on the removal direction side is referred to as the drainage space 17.

Further, the engaged main body 11 of this example has a first communication port 17a through which the drainage space 17 communicates with the outside on the insertion direction side of the engaged protrusion 12, and a second communication port 17b through which the drainage space 17 communicates with the outside on the removal direction side of the first communication port 17a (FIGS. 1, 2, 5 and 6). In this example, the end portion of the drainage space 17 on the insertion direction side is referred to as the first communication port 17a, and the end portion of the drainage space 17 on the removal direction side is referred to as the second communication port 17b. That is, in the engaged main body 11, the first communication port 17a and the second communication port 17b are disposed opposite to each other in the insertion and removal directions so that the first communication port 17a is opened in the insertion direction and the second communication port 17b is opened in the removal direction. Therefore, in the engaged main body 11, the drainage space 17 can be formed, using an extraction hole of a mold for forming the gap between the first engaged wall 13 and a piece body 14c to be described later. Further, the first communication port 17a, the second communication port 17b, and the drainage space 17 contribute to an improvement in the formability of the engaged main body 11.

In the engaged body 10, the engaged protrusion 12 is made to protrude from an outer wall surface 14a of the second engaged wall 14. The engaged protrusion 12 of this example is formed in a claw shape in which an end surface on the removal direction side is set as a locked surface 12a, and is disposed on the outer wall surface 14a of the second engaged wall 14 on the removal direction side (FIGS. 1 to 6). On the removal direction side of the second engaged wall 14, two notches 14b extending from the end surface on the removal direction side to the insertion direction side are formed at an interval in the width direction (see FIG. 1). Each notch 14b is used for forming a flexible piece body 14c (FIGS. 1, 2, 5 and 6) on the removal direction side of the second engaged wall 14. The engaged protrusion 12 is provided on the outer wall surface of the piece body 14c.

In the engaged body 10, the first, third and fourth engaged walls 13, 15 and 16 further extend to the removal direction side than the second communication port 17b.

The engaging body 20 has a main body (hereinafter, referred to as an "engaging main body") 21 which accommodates the engaged body 10, and a locker 22 disposed opposite to the locked surface 12a of the engaged protrusion 12 after accommodation of the engaged body 10 in the insertion and removal directions (FIGS. 1 to 6).

The engaging main body 21 of this example has first and second walls (hereinafter, referred to as "first and second engaging walls") 23 and 24 disposed opposite to each other at an interval in an orthogonal direction to the insertion and removal directions, and third and fourth walls (hereinafter, referred to as "third and fourth engaging walls") 25 and 26 disposed opposite to each other at an interval in an orthogonal direction (hereinafter, referred to as a "width direction") to the insertion and removal directions and the opposite arrangement direction of the first and second engaging walls 23 and 24 (FIGS. 1 and 2).

The first and second engaging walls 23 and 24 of this example are formed in a rectangular flat plate shape. Further, in this example, a third engaging wall 25 is provided as a connecting wall which connects one end portions in the width direction of the first engaging wall 23 and the second engaging wall 24, and a fourth engaging wall 26 is provided as a connecting wall which connects the other end portions in the width direction of the first engaging wall 23 and the second engaging wall 24. That is, the engaging main body 21 of this example is formed in a rectangular tube shape by the first to fourth engaging walls 23 to 26. Therefore, the engaging main body 21 has a rectangular internal space surrounded by the respective inner wall surfaces of the first to fourth engaging walls 23 to 26. The internal space is used as an accommodation space 27 in which the engaged main body 11 of the engaged body 10 is accommodated (FIGS. 1 to 6). For example, in the lock structure 1, an amount of insertion of the engaged main body 11 with respect to the accommodation space 27 is restricted, by locking the engaged main body 11 with the inner wall surface of the accommodation space 27 in the insertion direction.

Further, the engaging main body 21 of this example has an insertion port 27a through which the engaged main body 11 of the engaged body 10 is inserted into the accommodation space 27 from a tip $11a_1$ of the end portion 11a on the insertion direction side (FIGS. 1, 2, 5 and 6). Furthermore, the engaging main body 21 of this example has a communication port 27b through which the accommodation space 27 communicates with the outside on the insertion direction side of the insertion port 27a (FIGS. 1 to 6). In this example, the end portion of the accommodation space 27 on the removal direction side is set as an insertion port 27a, and the end portion of the accommodation space 27 on the insertion direction side is set as a communication port 27b. That is, in the engaging main body 21, the insertion port 27a and the communication port 27b are disposed opposite to each other in the insertion and removal directions so that the insertion port 27a opens in the removal direction and the communication port 27b opens in the insertion direction.

Further, the engaging main body 21 of this example is a penetration hole provided in the second engaging wall 24, and has a locking hole 24a into which the engaged protrusion 12 is inserted when the engaged main body 11 of the engaged body 10 is accommodated in the accommodation space 27 (FIGS. 1 to 6). The locking hole 24a has at least a peripheral wall surface disposed on the removal direction side. The peripheral wall surface of the locking hole 24a on the removal direction side is a locking surface for locking the locked surface 12a of the engaged protrusion 12 after insertion into the locking hole 24a in the insertion and removal directions, and is used as a locker 22. Therefore, the peripheral wall surface of the locking hole 24a on the removal direction side is formed at a position disposed opposite to the locked surface 12a of the engaged protrusion 12 after the insertion in the insertion and removal directions. Further, the peripheral wall surface of the locking hole 24a on the removal direction side is formed at a position and in a shape in which it is possible to lock the locked surface 12a of the engaged protrusion 12 after insertion on the removal direction side, thereby restricting the relative movement of the engaged main body 11 of the engaged body 10 with respect to the engaging main body 21 of the engaging body 20 in the removal direction. In this example, the locking hole 24a is formed in a rectangular shape, and the peripheral wall surface of one side of the locking hole 24a on the removal direction side is used as the locker 22.

In the engaging main body 21, the communication port 27b is disposed on the insertion direction side of the locking hole 24a. For example, each of the locking hole 24a and the communication port 27b may be formed as separate penetration holes and openings, by interposing a part of the second engaging wall 24 between them, and may be formed without interposing a part of the second engaging wall 24 between them. The locking hole 24a of this example is formed as a penetration hole connected to the communication port 27b by extending to the end surface of the second engaging wall 24 on the insertion direction side.

In the lock structure 1, in order to insert and remove the engaged body 10 and the engaging body 20, a minute gap is provided between the wall surfaces disposed opposite to each other. Therefore, the lock structure 1 is desirably configured to prevent liquid such as water from entering the inside of the housing 110 from the gap, when there is a gap connected to the inside of the housing 110 to be described later.

For example, in the lock structure 1 of the present embodiment, when the engaged main body 11 of the engaged body 10 is accommodated with respect to the engaging main body 21 of the engaging body 20, the first communication port 17a of the engaged main body 11 and the communication port 27b of the engaging main body 21 are connected to each other via the accommodation space 27 between them. Furthermore, in the lock structure 1, when the engaged main body 11 is in the accommodated state, the locking hole 24a of the engaging main body 21 is also connected to the first communication port 17a via the accommodation space 27. Therefore, the lock structure 1 has the following effects when installed in a state in which the liquid may enter the accommodation space 27 from the communication port 27b, the locking hole 24a, and the like, for example, such as a case where the first communication port 17a and the communication port 27b face upward.

Figure 7:
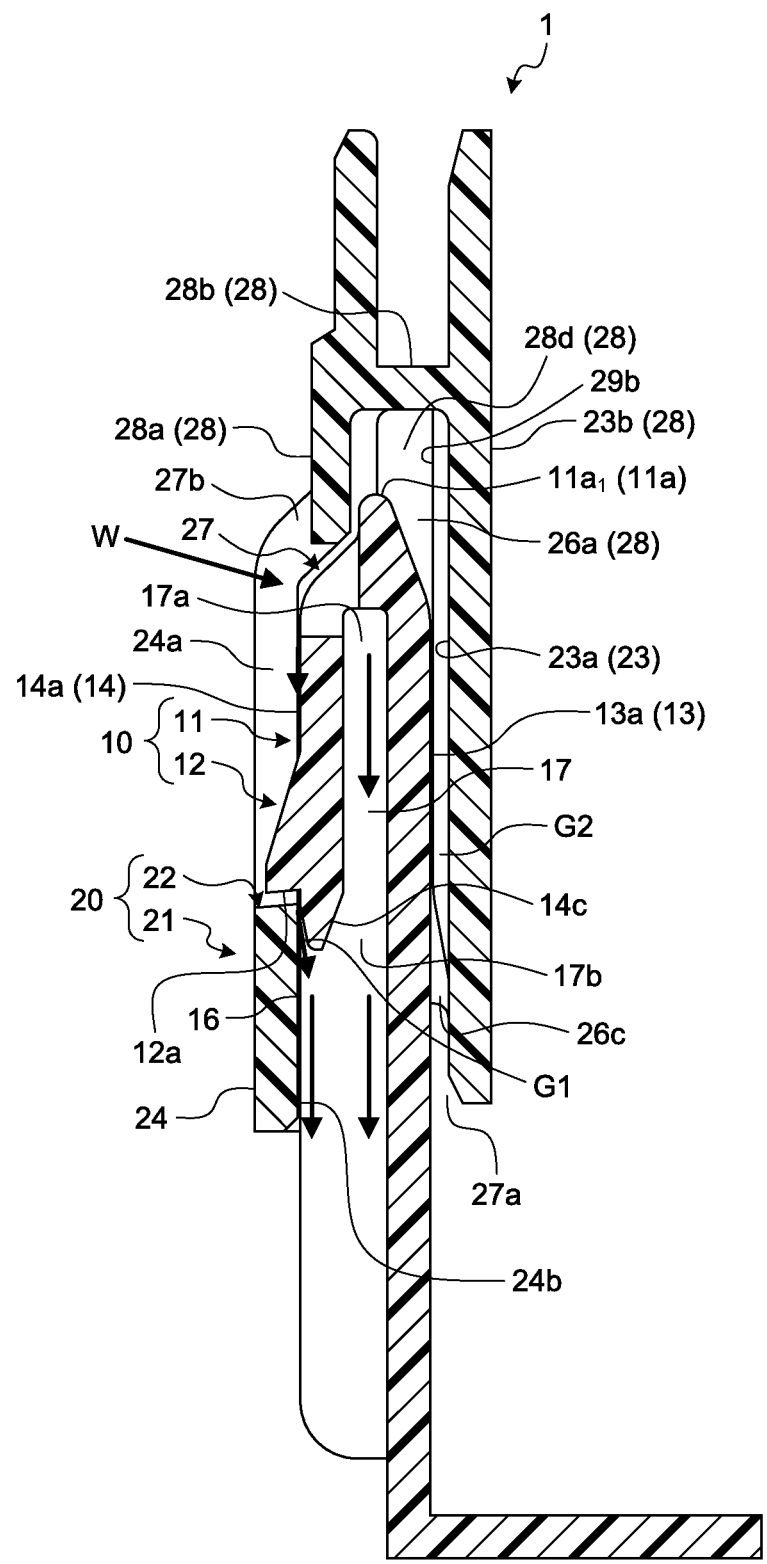
FIG. 7 is a diagram illustrating an example of a path of liquid.

In the lock structure 1 in the installed state, even if the liquid W enters the accommodation space 27 from the communication port 27b, the locking hole 24a, and the like, and the liquid W having entered is guided to the end portion 11a of the engaged main body 11 on the insertion direction side, the liquid W can be introduced into the drainage space 17 from the first communication port 17a and discharged outward from the second communication port 17b (FIG. 7). In particular, in the lock structure 1 of this example, since the first communication port 17a is disposed at a linear position with respect to the communication port 27b and the locking hole 24a, the liquid W having entered the accommodation space 27 from the communication port 27b or the locking hole 24a can be introduced directly and easily into the drainage space 17 from the first communication port 17a. In this way, since the lock structure 1 of the present embodiment is provided with the drainage space 17 as a drainage space of the liquid W, the liquid W having entered between the engaged body 10 and the engaging body 20 can be discharged outward from the drainage space 17. Therefore, the lock structure 1 can suppress the entry of the liquid W into the gap between the engaged body 10 and the engaging body 20 connected to the inside of the housing 110.

Further, in the lock structure 1 of the installed state, when the liquid W enters the accommodation space 27 from the communication port 27b or the locking hole 24a, the liquid W can be discharged outward from a gap G1 between the outer wall surface 14a of the second engaged wall 14 of the engaged main body 11 and an inner wall surface 24b of the second engaging wall 24 of the engaging main body 21 (FIG. 7). Therefore, the lock structure 1 can also suppress the entry of the liquid W into the gap between the engaged body 10 and the engaging body 20 connected to the inner side of the housing 110 from this point.

Figure 8:
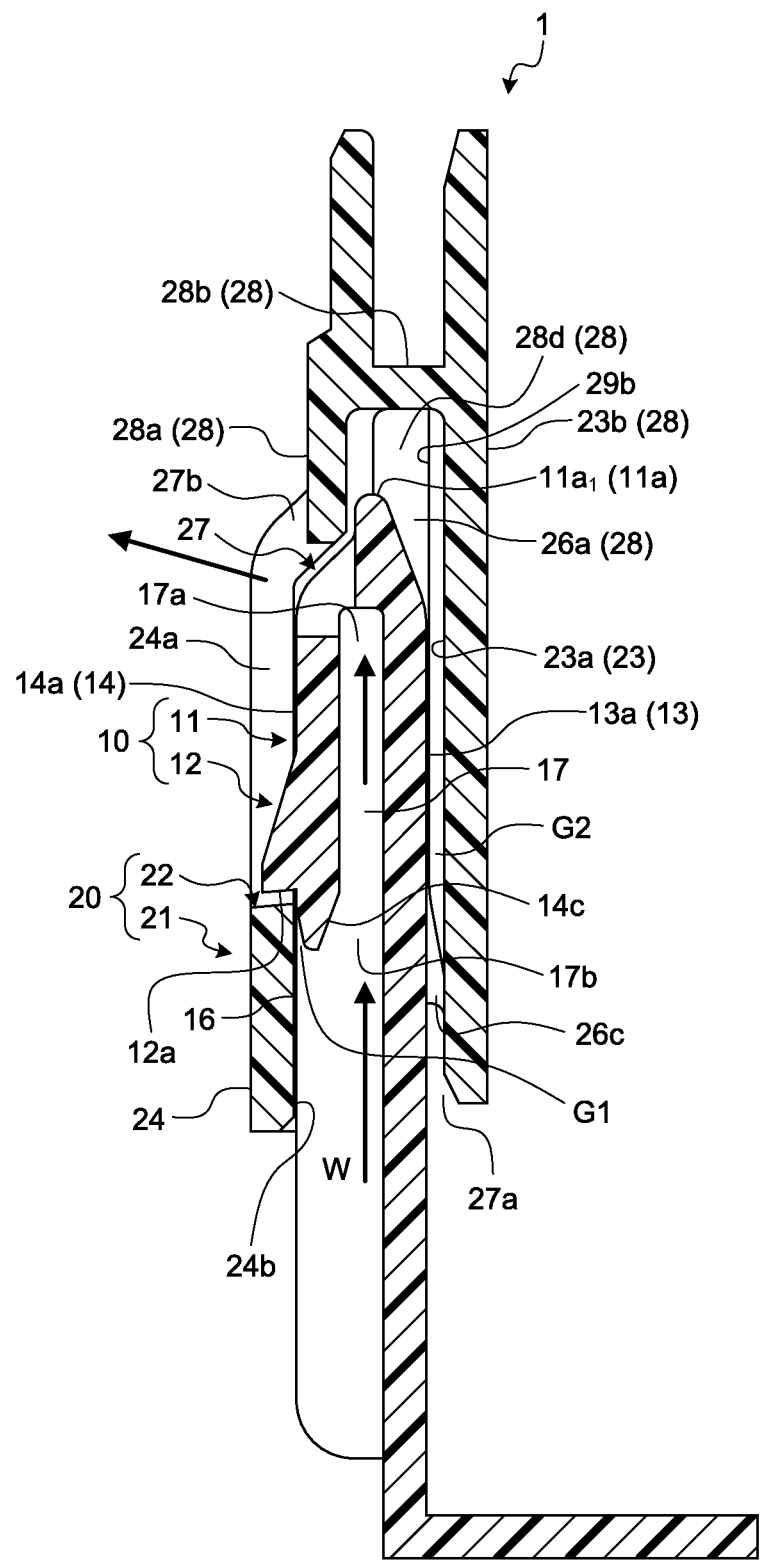
FIG. 8 is a diagram illustrating an example of the path of liquid.

Further, in the lock structure 1 of the installed state, when the liquid W having a high entry speed enters from the insertion port 27*a* side, the liquid W is introduced into the drainage space 17 from the second communication port 17*b*, and can also be discharged outward from the first communication port 17*a* (FIG. 8). Therefore, in the lock structure 1 of the present embodiment, even in an installed state in which the liquid W may enter from the second communication port 17*b*, for example, such as a case where the second communication port 17*b* faces upward, the liquid W can be discharged outward from the first communication port 17*a*. Therefore, the lock structure 1 can suppress the entry of the liquid W into the gap between the engaged body 10 and the engaging body 20 connected to the inside of the housing 110 also from this point.

Figure 6:
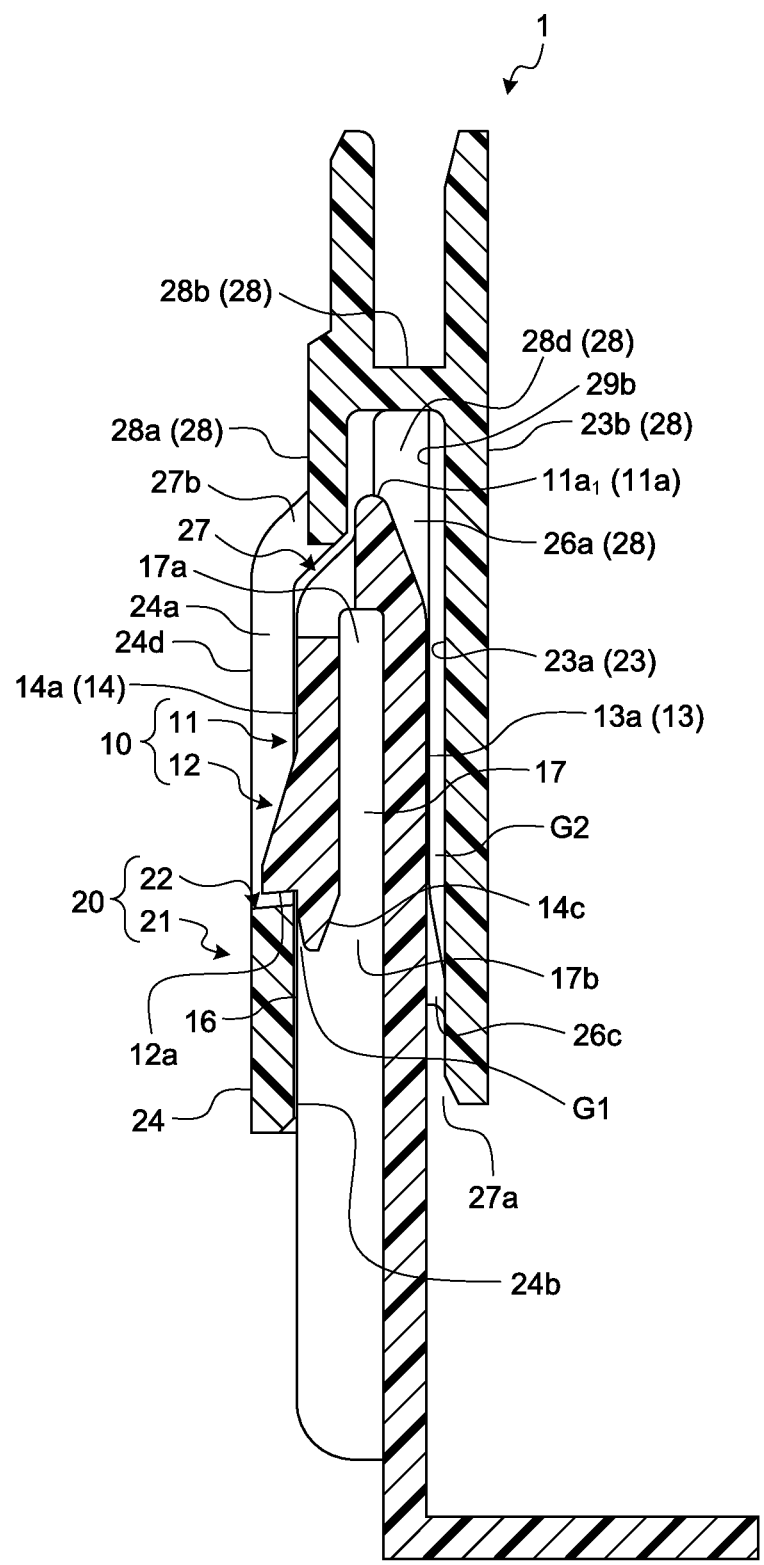
FIG. 6 is a cross-sectional view taken along the line X-X of FIG. 4.

Here, in the lock structure 1, when the liquid that has not been discharged outward travels over a tip 11*a*₁ of the end portion 11*a* of the engaged main body 11 on the insertion direction side, there is a possibility that the liquid may be transmitted to a gap G2 between an outer wall surface 13*a* of the first engaged wall 13 of the engaged main body 11 and an inner wall surface 23*a* of the first engaging wall 23 of the engaging main body 21 (FIG. 6). For example, when the tip 11*a*₁ of the engaged main body 11 is exposed outward, there is a possibility that the liquid linearly enters toward the tip 11*a*. Further, in a specific application example of the lock structure 1 to be described later, the gap G2 between the outer wall surface 13*a* of the first engaged wall 13 and the inner wall surface 23*a* of the first engaging wall 23 is connected to the inside of the housing 110. Therefore, the lock structure 1 is configured such that the linear entry of the liquid toward the tip 11*a* of the engaged main body 11 is suppressed by forming the engaging body 20 as follows.

The engaging body 20 has a cover 28 which covers the end portion 11*a* of the engaged main body 11 on the insertion direction side after being accommodated into the accommodation space 27 (FIGS. 1 to 6). The cover 28 of this example has an end portion 23*b* (FIGS. 5 and 6) of the first engaging wall 23 on the insertion direction side, a first covering wall 28*a* (FIGS. 1 to 6) which is disposed opposite to the end portion 23*b* at an interval and in which the end portion 11*a* of the engaged main body 11 after accommodation is interposed between the end portion 23*b* and the first covering wall 28*a*, an end portion 25*a* (FIGS. 1 to 4) on the insertion direction side of the third engaging wall 25 for connecting the end portion 23*b* and one end portion in the width direction of the first covering wall 28*a*, an end portion 26*a* (FIGS. 1 to 6) on the insertion direction side of the fourth engaging wall 26 for connecting the end portion 23*b* and the other end portion in the width direction of the first covering wall 28*a*, and a second covering wall 28*b* (FIGS. 5 and 6) which close an opening surrounded by the end portions 23*b*, 25*a* and 26*a* and the tip of the first covering wall 28*a* on the insertion direction side. The first covering wall 28*a* of this example is formed in a rectangular flat plate shape in which the insertion direction side and the removal direction side starting from the communication port 27*b* are connected to each other. Further, the second covering wall 28*b* of this example is formed in a rectangular flat plate shape, and is disposed opposite to the tip 11*a*₁ of the engaged main body 11 in the insertion and removal directions.

Figure 9:
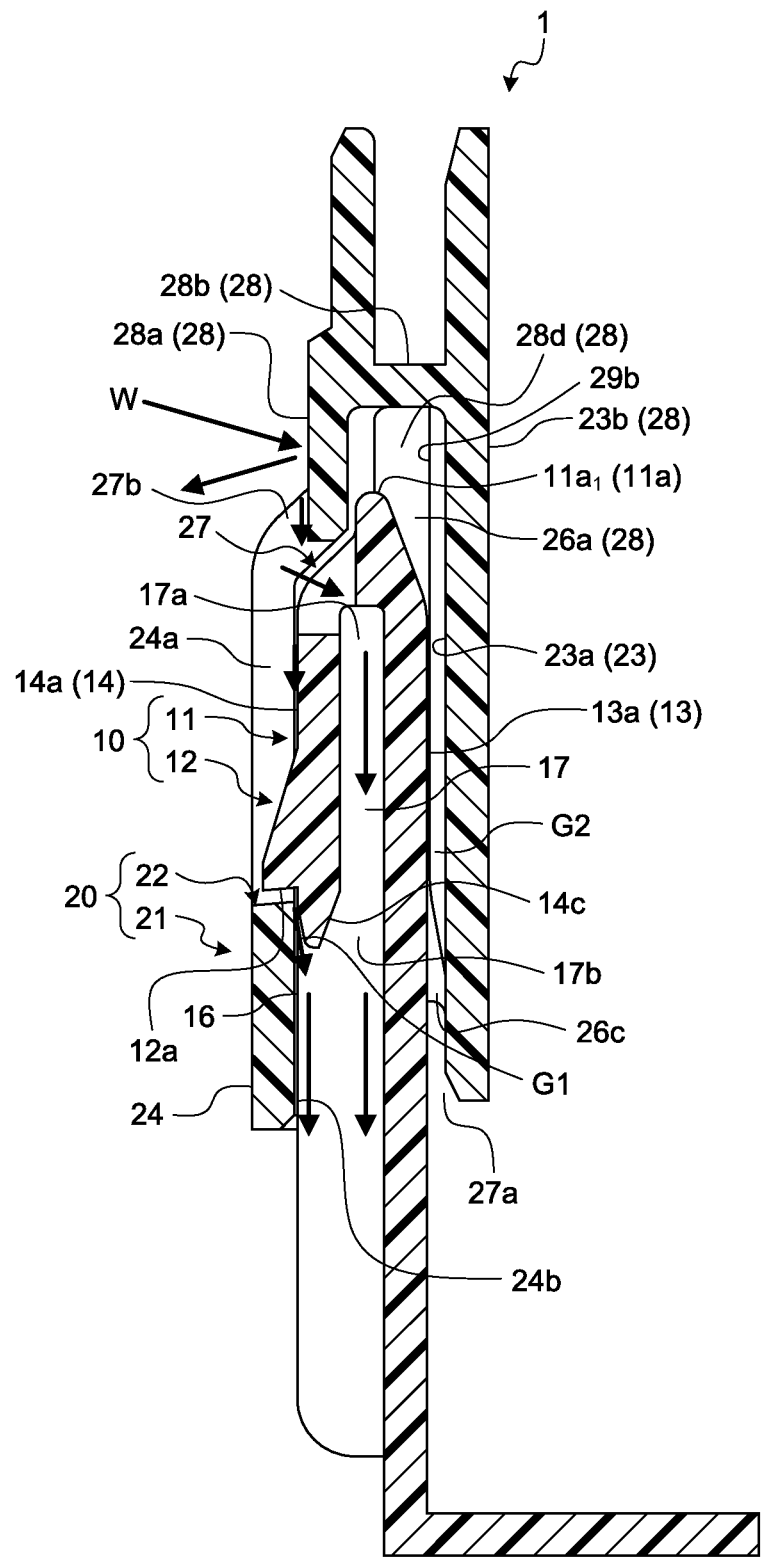
FIG. 9 is a diagram illustrating an example of the path of liquid.

In the lock structure 1, the liquid W linearly directed to the tip 11*a* of the engaged main body 11 can be stopped by the cover 28 (FIG. 9). Further, for example, in the lock structure 1, since the liquid W is stopped by the cover 28, it is possible to suppress the entry of the liquid W into the gap G2 between the outer wall surface 13*a* of the first engaged wall 13 of the engaged main body 11 in front of the tip 11*a* and the inner wall surface 23*a* of the first engaging wall 23 of the engaging main body 21. Further, in the lock structure 1, it is also possible to suppress the entry of the liquid W stopped by the end portion 25*a* of the third engaging wall 25, the end portion 26*a* of the fourth engaging wall 26, and the second covering wall 28*b*, into a part between the engaged body 10 and the engaging body 20. Further, in the lock structure 1, by disposing the first covering wall 28*a* of the cover 28 on the insertion direction side of the first communication port 17*a*, even if the liquid W stopped by the first covering wall 28*a* enters the accommodation space 27, the liquid W can be discharged outward from the gap G1 between the outer wall surface 14*a* of the second engaged wall 14 and the inner wall surface 24*b* of the second engaging wall 24 or the drainage space 17 (FIG. 9). Therefore, the lock structure 1 can suppress the entry of the liquid W into the gap between the engaged body 10 and the engaging body 20 connected to the inside of the housing 110.

Figure 10:
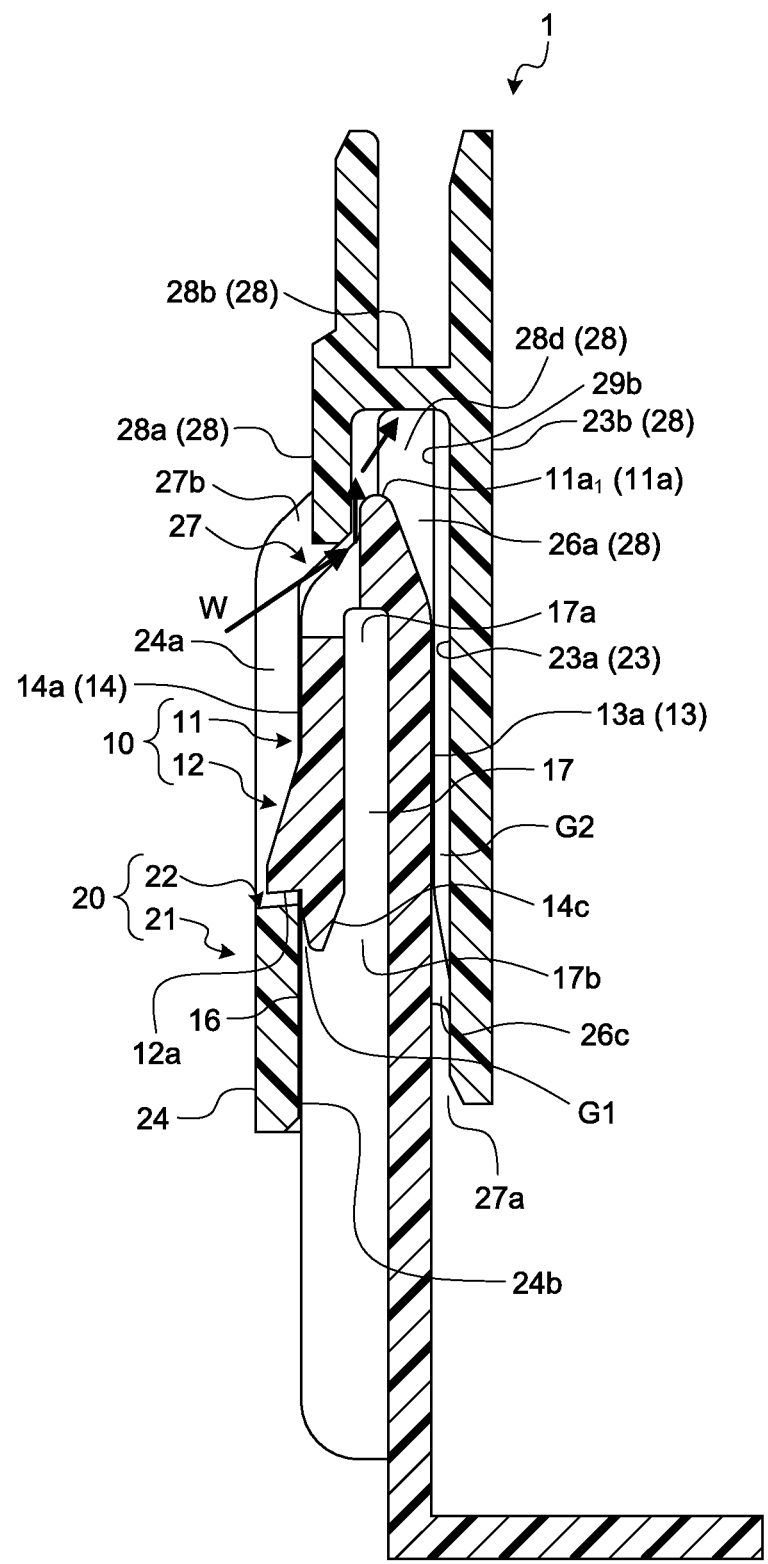
FIG. 10 is a diagram illustrating an example of the path of liquid.

The cover 28 preferably has a space 28*d* (FIG. 6) on the insertion direction side of the tip 11*a* of the engaged main body 11 after being accommodated in the accommodation space 27. The lock structure 1 has a high entry speed of the liquid W entering the accommodation space 27 from the locking hole 24*a*. Thus, even if the liquid W is guided to the tip 11*a* of the engaged main body 11 along the inner wall surface on the insertion direction side of the first communication port 17*a* in the first engaged wall 13, the lock structure 1 can suppress the momentum of the liquid W having passed over the tip 11*a* of the engaged main body 11 by the space 28*d* (FIG. 10). Therefore, the space 28*d* has the shape and volume that can reduce the speed of the liquid W and suppress the momentum of the liquid W, when the liquid W passes over the tip 11*a* of the engaged main body 11 in such a manner. Therefore, the lock structure 1 can reduce the amount of entry of the liquid W, even if the liquid W enters the gap G2 between the outer wall surface 13*a* of the first engaged wall 13 and the inner wall surface 23*a* of the first engaging wall 23 from the space 28*d*. Therefore, the lock structure 1 can suppress the entry of the liquid W to the inside of the housing 110.

Further, the lock structure 1 can suppress the entry of the liquid W into the gap G3 (FIG. 11) between an outer wall surface 15*a* of the third engaged wall 15 and an inner wall surface 25*b* of the third engaging wall 25, and can suppress the entry of the liquid W into the gap G4 (FIG. 11) between an outer wall surface 16*a* of the fourth engaged wall 16 and an inner wall surface 26*b* of the fourth engaging wall 26, by the cover 28.

Furthermore, it is desirable that the lock structure 1 reduces the amount of entry of liquid to the gap between the engaged body 10 and the engaging body 20 connected to the inside of the housing 110, by providing a labyrinth structure to be described below.

Figure 11:
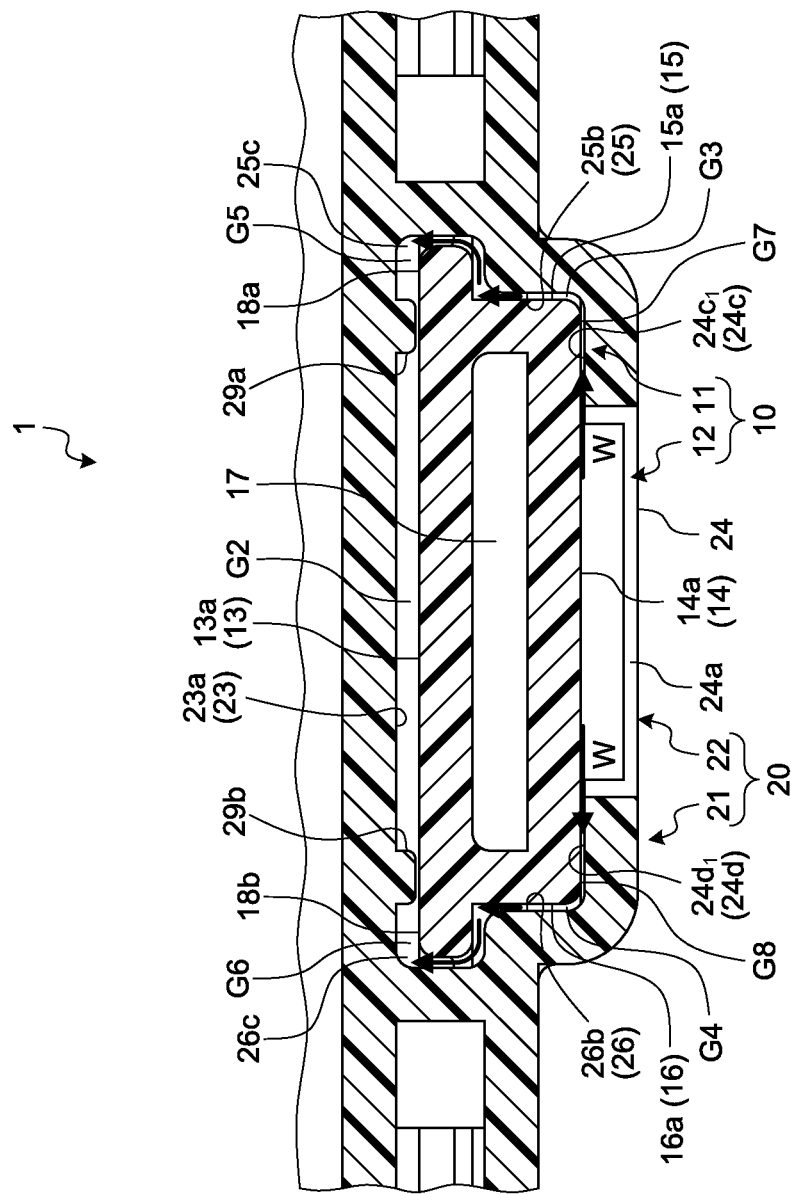
FIG. 11 is a cross-sectional view taken along line Y1-Y1 of FIG. 4 and illustrating an example of the path of the liquid.

The engaged body 10 has a first protruding wall 18*a* made to intersect the outer wall surface 15*a* of the third engaged wall 15 to protrude from the outer wall surface 15*a* and extend in the insertion and removal directions, and a second protruding wall 18*b* made to intersect with the outer wall surface 16*a* of the fourth engaged wall 16 to protrude from the outer wall surface 16*a* and extend in the insertion and removal directions (FIGS. 2 and 11). The first protruding wall 18*a* of this example protrudes from the side of the first engaging wall 23 of the outer wall surface 15*a* of the third engaged wall 15 in the orthogonal direction to the outer wall surface 15*a*. Further, the second protruding wall 18*b* of this example protrudes from the side of the first engaging wall 23 of the outer wall surface 16*a* of the fourth engaged wall 16 in the orthogonal direction to the outer wall surface 16*a*. The first protruding wall 18*a* and the second protruding wall 18*b* protrude in the direction opposite to each other in the width direction on the same plane as that of the first engaged wall 13.

Figure 5:
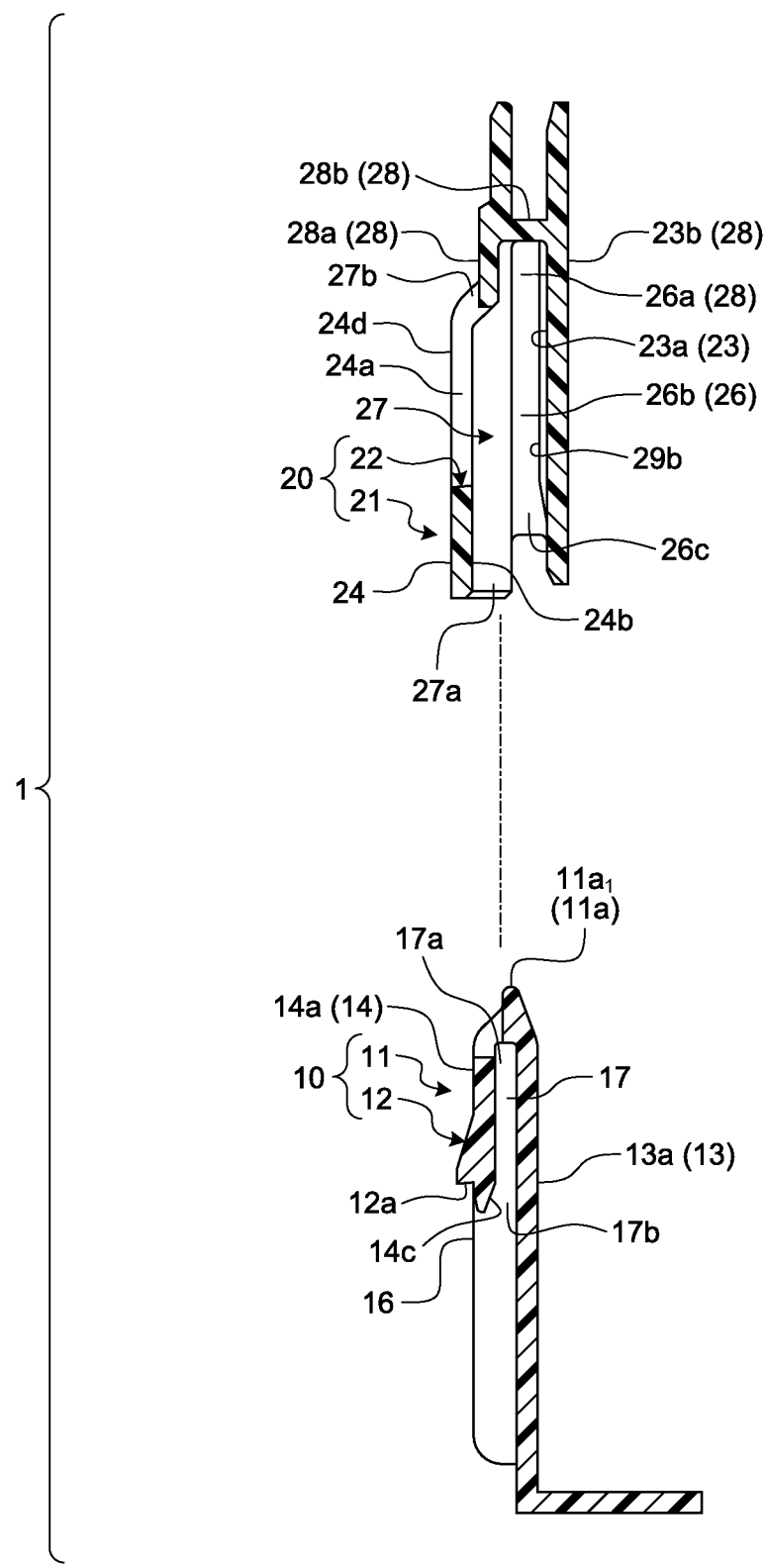
FIG. 5 is a cross-sectional view taken along line X-X of FIG. 2.

The third engaging wall 25 of the engaging main body 21 has a groove 25*c* that accommodates the first protruding wall 18*a* of the engaged body 10 (FIG. 11). Further, the fourth engaging wall 26 of the engaging main body 21 has a groove 26*c* that accommodates the second protruding wall 18*b* of the engaged body 10 (FIGS. 5 and 11). The groove 25*c* of this example is provided on the inner wall surface 25*b* of the third engaging wall 25. Further, the groove 26*c* of this example is provided on the inner wall surface 26*b* of the fourth engaging wall 26.

In the lock structure 1, a gap G5 is formed between the first protruding wall 18*a* and the groove 25*c* (FIG. 11). The gap G3 between the outer wall surface 15*a* of the third engaged wall 15 and the inner wall surface 25*b* of the third engaging wall 25 is connected to the gap G2 between the outer wall surface 13*a* of the first engaged wall 13 and the inner wall surface 23*a* of the first engaging wall 23 via the gap G5 (FIG. 11). Therefore, in the lock structure 1, since the labyrinth structure is formed by the gaps G3 and G5, the entry of the liquid W into the gap G2 can be suppressed. Furthermore, even if the liquid W enters the gap G3 and reaches the gap G2, since the liquid W having entered the gap G3 reaches the gap G2 after passing through the gap G5, an amount of reaching the gap G2 can be reduced. Further, in the lock structure 1 of this example, one end of the gap G2 in the width direction is shared as a part of the gap G5.

Further, in the lock structure 1, a gap G6 is formed between the second protruding wall 18*b* and the groove 26*c* (FIG. 11). The gap G4 between the outer wall surface 16*a* of the fourth engaged wall 16 and the inner wall surface 26*b* of the fourth engaging wall 26 is connected to the gap G2 via the gap G6 (FIG. 11). Therefore, in the lock structure 1, since the labyrinth structure is formed by the gaps G4 and G6, the entry of the liquid W into the gap G2 can be suppressed. Furthermore, even if the liquid W enters the gap G4 and reaches the gap G2, since the liquid W having entered the gap G4 reaches the gap G2 after passing through the gap G6, the amount of reaching the gap G2 can be reduced. Further, in the lock structure 1 of this example, the other end of the gap G2 in the width direction is shared as a part of the gap G6.

The lock structure 1 can suppress the entry of the liquid W to the inside of the housing 110 by such a labyrinth structure.

In the lock structure 1, the combination of the first protruding wall 18*a* and the groove 25*c*, and the combination of the second protruding wall 18*b* and the groove 26*c* also serve as a guide mechanism, respectively, when inserting the engaged main body 11 into the accommodation space 27.

Incidentally, the second engaging wall 24 of the engaging main body 21 has one edge portion 24*c* of the locking hole 24*a* in the width direction, and an other edge portion 24*d* of the locking hole 24*a* in the width direction (see FIGS. 1 to 4 and 11). One edge portion 24*c* is a part of the second engaging wall 24 connected to the third engaging wall 25, and is disposed to be orthogonal to the third engaging wall 25. An inner wall surface $24c_1$ of the one edge portion 24*c* is disposed opposite to one end in the width direction of the outer wall surface 14*a* of the second engaged wall 14 (FIG. 11). That is, in the lock structure 1 of this example, the gap G3 is connected to the outside via a gap G7 between one end in the width direction of the outer wall surface 14*a* of the second engaged wall 14 and the inner wall surface $24c_1$ of the one edge portion 24*c*. Therefore, in the lock structure 1, since the labyrinth structure is formed by the gaps G7, G3 and G5, the entry of the liquid W into the gap G2 can be further suppressed, and even if the liquid reaches the gap G2, since the liquid reaches the gap G2 after passing through the gaps G7, G3 and G5, the amount of reaching the gap G2 can be further reduced. Further, the other edge portion 24*d* is a part of the second engaging wall 24 connected to the fourth engaging wall 26, and is disposed to be orthogonal to the fourth engaging wall 26. An inner wall surface $24d_1$ of the other edge portion 24*d* is disposed opposite to the other end of the outer wall surface 14*a* of the second engaged wall 14 in the width direction (FIG. 11). That is, in the lock structure 1 of this example, the gap G4 is connected to the outside via a gap G8 between the other end in the width direction of the outer wall surface 14*a* of the second engaged wall 14 and the inner wall surface $24d_1$ of the other edge portion 24*d*. Therefore, in the lock structure 1, since the labyrinth structure is formed by the gaps G8, G4 and G6, the entry of the liquid W into the gap G2 can be further suppressed, and even if the liquid reaches the gap G2, since the liquid reaches the gap G2 after passing through the gaps G8, G4 and G6, the amount reaching the gap G2 can be further reduced. In this way, the lock structure 1 of this example can further suppress the entry of the liquid W to the inside of the housing 110.

The lock structure 1 also includes a labyrinth structure to be described below.

Figure 12:
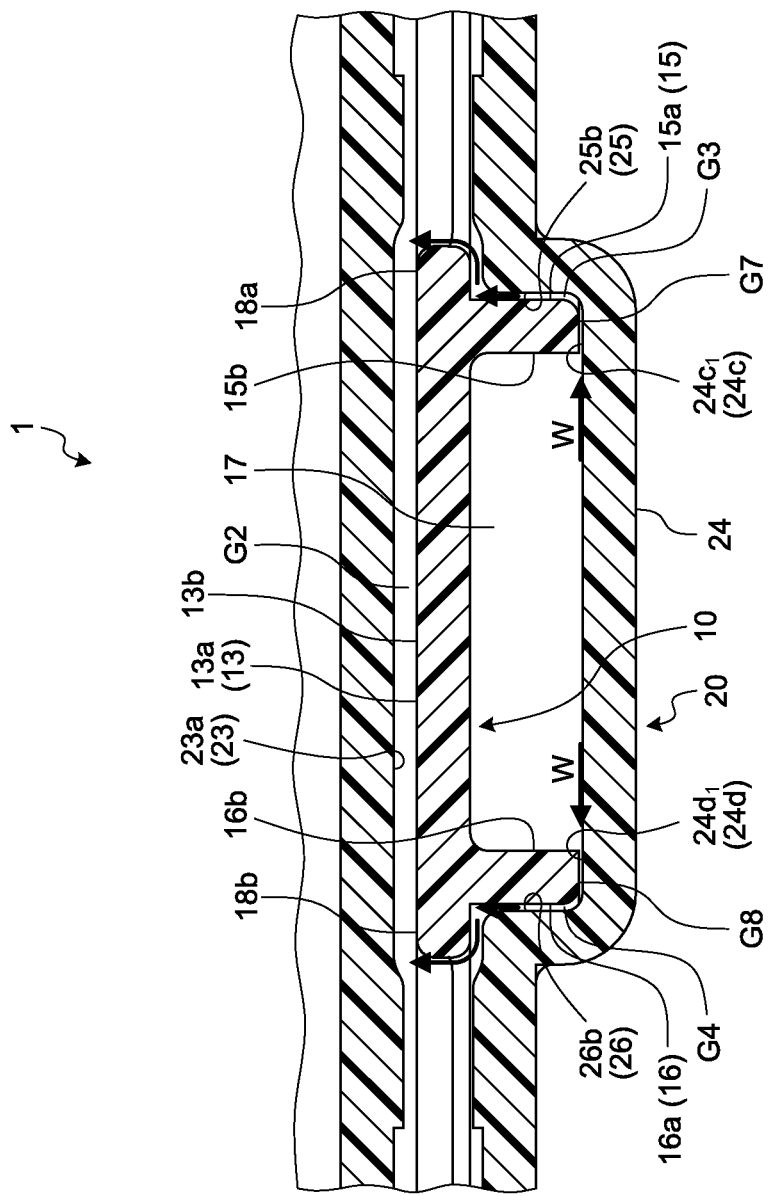
FIG. 12 is a cross-sectional view taken along line Y2-Y2 of FIG. 4 and illustrating an example of the path of the liquid.

The engaged body 10 has a first extension wall 13*b* that extends to protrude from the engaged main body 11 in the removal direction and is disposed opposite to the inner wall surface 23*a* of the first engaging wall 23 after the engaged main body 11 is accommodated in the accommodation space 27 (FIG. 12). In this example, the first engaged wall 13 extends in the removal direction, and the extending portion is used as the first extension wall 13*b*. Therefore, in the lock structure 1 of this example, the gap G2 between the outer wall surface 13*a* of the first engaged wall 13 and the inner wall surface 23*a* of the first engaging wall 23 is connected to the first extension wall 13*b*.

Further, the engaged body 10 has a second extension wall 15*b* that extends to protrude from the engaged main body 11 in the removal direction, and is disposed opposite to the inner wall surface 25*b* of the third engaging wall 25 after the engaged main body 11 is accommodated in the accommodation space 27 (FIG. 12). The second extension wall 15*b* is vertically provided as a rib on the inner wall surface of the first extension wall 13*b*. In this example, the third engaged wall 15 extends in the removal direction, and the extending portion is used as the second extension wall 15*b*. Therefore, in the lock structure 1 of this example, the gap G3 between the outer wall surface 15*a* of the third engaged wall 15 and the inner wall surface 25*b* of the third engaging wall 25 is connected to the second extension wall 15*b*.

Furthermore, the second extension wall 15*b* is vertically provided from the inner wall surface of the first extension wall 13*b* to the position of the outer wall surface 14*a* of the second engaged wall 14, and the end surface on the side of the vertical provision direction is disposed opposite to the inner wall surface $24c_1$ of one edge portion 24*c* of the second engaging wall 24. Therefore, in the lock structure 1 of this example, the gap G7 between one end in the width direction of the outer wall surface 14*a* of the second engaged wall 14 and the inner wall surface $24c_1$ of the one edge portion 24*c* is connected to the second extension wall 15*b*.

In the lock structure 1, since the labyrinth structure is formed by the gaps G3 and G7 in the second extension wall 15b, the entry of the liquid W into the gap G2 can be suppressed.

Here, the first protruding wall 18a of this example extends to the second extension wall 15b in the insertion and removal directions (FIG. 12). Therefore, the liquid W having entered the gap G3 of the second extension wall 15b has to go over the first protruding wall 18a in order to reach the gap G2. That is, in the lock structure 1, since a creeping distance is increased by the first protruding wall 18a extending to the second extension wall 15b, even if the liquid W enters the gap G3 of the second extension wall 15b and reaches the gap G2, the amount of the liquid W reaching the gap G2 can be reduced. Further, in the lock structure 1, the groove 25c may extend so that the first protruding wall 18a positioned on the second extension wall 15b can be accommodated.

Further, the engaged body 10 has a third extension wall 16b that extends to protrude from the engaged main body 11 in the removal direction, and is disposed opposite to the inner wall surface 26b of the fourth engaging wall 26 after the engaged main body 11 is accommodated in the accommodation space 27 (FIG. 12). The third extension wall 16b is vertically provided as a rib on the inner wall surface of the first extension wall 13b. In this example, the fourth engaged wall 16 extends in the removal direction, and the extending portion is used as the third extension wall 16b. Therefore, in the lock structure 1 of this example, the gap G4 between the outer wall surface 16a of the fourth engaged wall 16 and the inner wall surface 26b of the fourth engaging wall 26 is connected to the third extension wall 16b.

Furthermore, the third extension wall 16b is vertically provided from the inner wall surface of the first extension wall 13b to the position of the outer wall surface 14a of the second engaged wall 14, and the end surface in the vertical provision direction is disposed opposite to the inner wall surface $24d_1$ of the other edge portion 24d of the second engaging wall 24. Therefore, in the lock structure 1 of this example, the gap G8 between the other end in the width direction of the outer wall surface 14a of the second engaged wall 14 and the inner wall surface $24d_1$ of the other edge portion 24d is connected to the third extension wall 16b.

In the lock structure 1, since the labyrinth structure is formed by the gaps G4 and G8 in the third extension wall 16b, the entry of the liquid W into the gap G2 can be suppressed.

Here, the second protruding wall 18b of this example extends to the third extension wall 16b in the insertion and removal directions (FIG. 12). Therefore, the liquid W having entered the gap G4 of the third extension wall 16b has to go over the second protruding wall 18b in order to reach the gap G2. That is, in the lock structure 1, since the creeping distance is increased by the second protruding wall 18b extending to the third extension wall 16b, even if the liquid W enters the gap G4 of the third extension wall 16b and reaches the gap G2, the amount of reaching of the liquid W to the gap G2 can be reduced. Further, in the lock structure 1, the groove 26c may extend so that the second protruding wall 18b positioned on the third extension wall 16b can be accommodated.

Furthermore, the engaging main body 21 of this example has a rib-like protrusion 29a provided at one end in the width direction of the inner wall surface 23a of the first engaging wall 23 (FIG. 11). The rib-like protrusion 29a protrudes from the inner wall surface 23a toward the outer wall surface 13a of the first engaged wall 13, and extends in the insertion and removal directions. Further, the engaging main body 21 of this example has a rib-like protrusion 29b provided at the other end in the width direction of the inner wall surface 23a of the first engaging wall 23 (FIGS. 5 to 11). The rib-like protrusion 29b protrudes from the inner wall surface 23a to the outer wall surface 13a of the first engaged wall 13, and extends in the insertion and removal directions. The respective protrusions 29a and 29b are formed within a range substantially equivalent to the locking hole 24a in the insertion and removal directions. Here, the protrusion 29a is disposed at a boundary between the gap G4 and the gap G2, and the protrusion 29b is disposed at a boundary between the gap G6 and the gap G2. Therefore, in the lock structure 1, each protrusion 29a and 29b also serves as a part of the labyrinth structure. Therefore, in the lock structure 1, the liquid W can be further suppressed from entering the gap G2, and even if the liquid reaches the gap G2, since the amount of reaching the gap G2 can be further reduced, it is possible to further suppress the entry of the liquid W into the inside of the housing 110. Further, each of the protrusions 29a and 29b serves as a guide when inserting the engaged main body 11 into the accommodation space 27, and serves to suppress the backlash between each other after the engaged main body 11 is accommodated in the accommodation space 27.

As described above, the lock structure 1 of the present embodiment can suppress the entry of the liquid W into the gap between the engaged body 10 and the engaging body 20 connected to the inside of the housing 110, and even if the liquid W enters the gap, it is possible to suppress the entry of the liquid W into the gap G2 directly connected to the inside of the housing 110 and to reduce the amount of the liquid W entering the gap G2. Thus, the entry the liquid W into the inside of the housing 110 can be suppressed.

The lock structure 1 can be applied to, for example, an electric connection box which accommodates an electronic component, an electric connection box which accommodates the electronic component and the electric wire and forms a wire harness together with the electric wire drawn outward, and the like. Here, the lock structure 1 applied to an electric connection box 100 (FIG. 13) forming the wire harness WH is illustrated.

Figure 13:
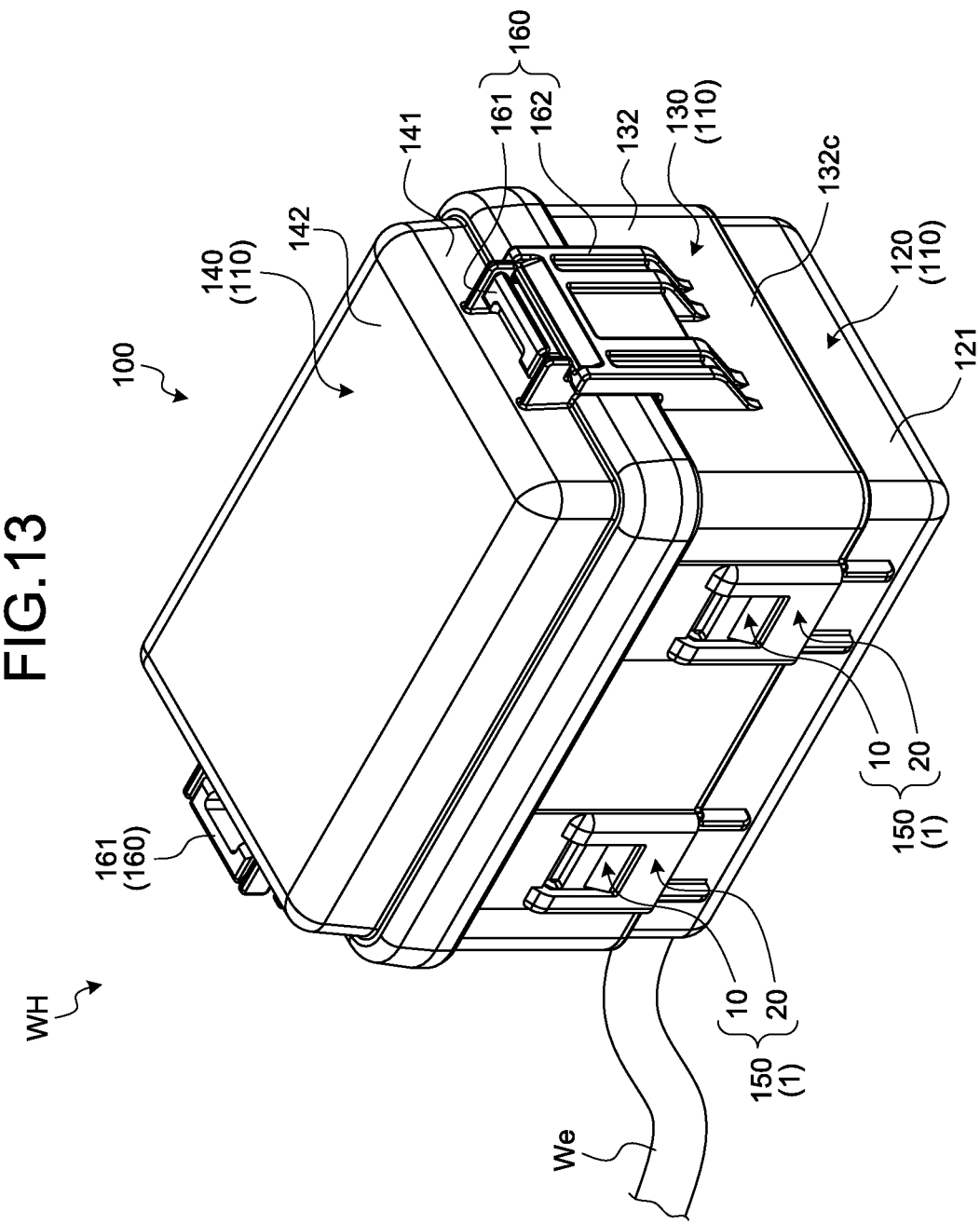
FIG. 13 is a perspective view illustrating an electric connection box and a wire harness to which the lock structure of the embodiment is applied.

The electric connection box 100 includes a housing 110 that accommodates an electronic component (not illustrated) therein. In the housing 110 of this example, an electric wire We electrically connected to the electronic component therein is also accommodated, and the electric wire We is drawn outward from the inside (FIG. 13). The electric connection box 100 electrically connects a connection target (not illustrated) to the electronic component via the electric wire We. In the electric connection box 100, the electronic component is electrically connected to the connection target via the electric wire We drawn outward from the inside of the housing 110.

The electronic components refer to, for example, a circuit protection component such as a relay and a fuse, a connector, a terminal fitting and the like. Here, electronic devices such as a circuit board and an electronic control unit (so-called ECU) are also considered as a form of the electronic components. Further, the connection target refers to a power supply such as a secondary battery, a load such as an electric device (an actuator or the like), a sensor, and the like. In the electric connection box 100, for example, one electric wire We is electrically connected to the power supply, and another electric wire We is electrically connected to the load, and the power supply and the load are electrically connected to each other via the electronic components.

Figure 14:
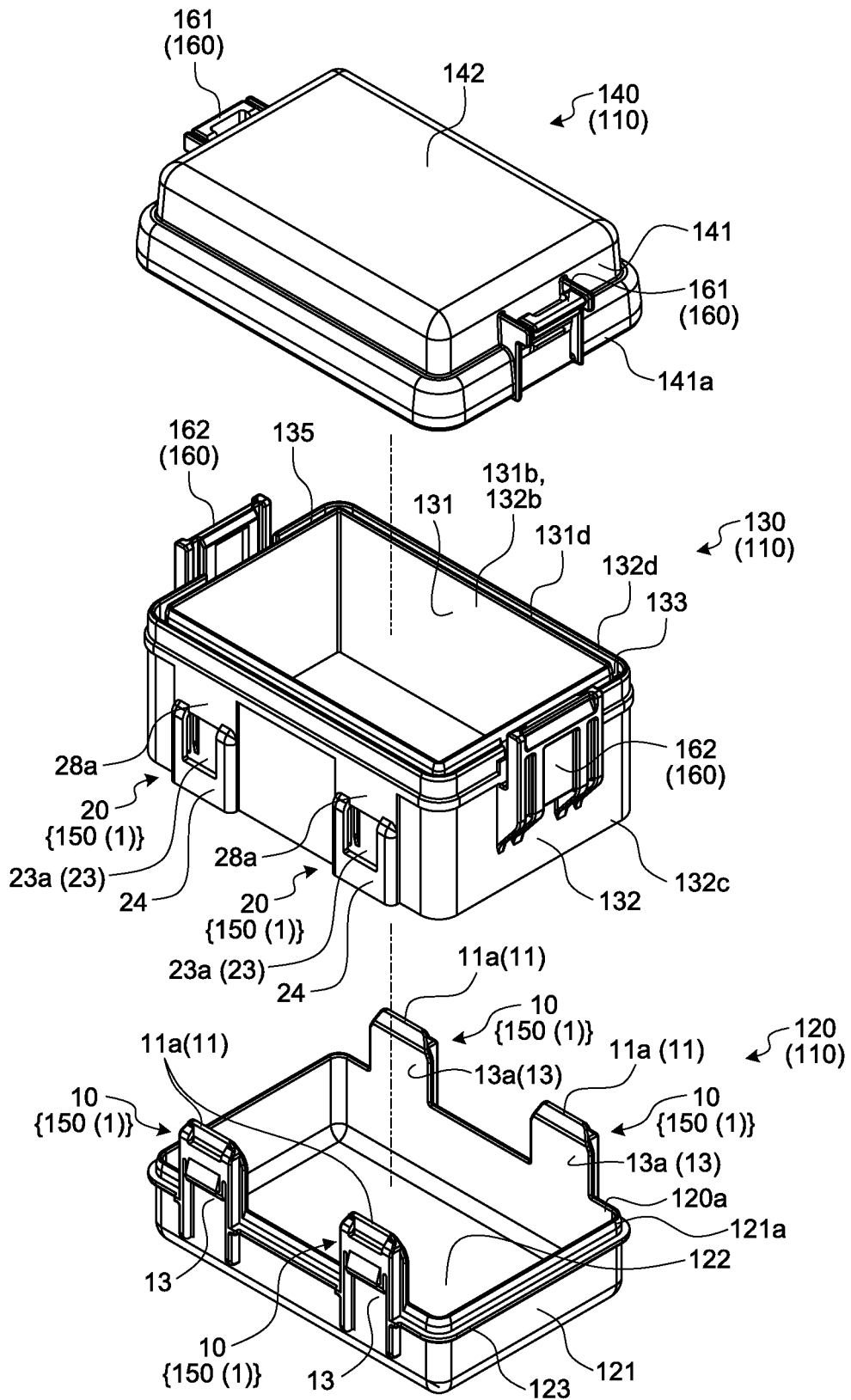
FIG. 14 is an exploded perspective view of a housing of the electric connection box.
Figure 15:
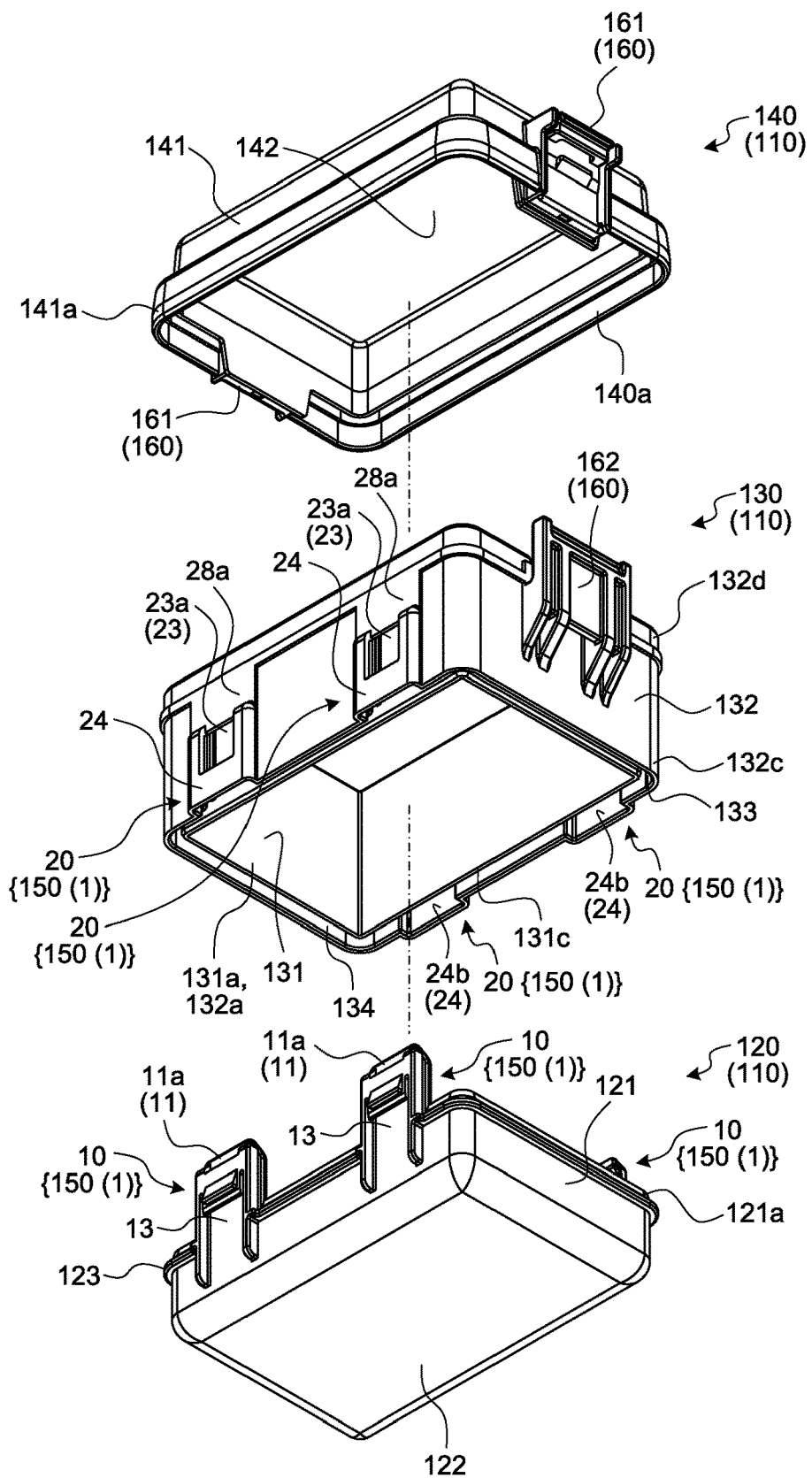
FIG. 15 is an exploded perspective view of the housing of the electric connection box as viewed from another angle.

The housing 110 is formed of an insulating material such as a synthetic resin. The housing 110 has at least first and second fitting members 120 and 130 to be fitted to each other (FIGS. 13 to 15). The housing 110 of this example further has a third fitting member 140 (FIGS. 13 to 15). The first fitting member 120, the second fitting member 130, and a third fitting member 140 are disposed in the housing 110 in that order. The housing 110 is formed by fitting the first fitting member 120 and the second fitting member 130, and by fitting the second fitting member 130 and the third fitting member 140.

In the housing 110 of this example, the middle second fitting member 130 is formed into a tubular shape, one opening of the second fitting member 130 is closed by the first fitting member 120, and the other opening of the second fitting member 130 is closed by the third fitting member 140. Here, the second fitting member 130 is a frame serving as the main body of the housing 110, and the first fitting member 120 and the third fitting member 140 serve as cover members for closing the opening of the second fitting member 130. For example, the housing 110 mounts the two openings of the second fitting member 130 disposed opposite to each other on a vehicle in a vertical direction of the vehicle. One of the first fitting member 120 and the third fitting member 140 may be a lower cover or an upper cover. Here, for convenience, the first fitting member 120 is defined as a lower cover, and the third fitting member 140 is defined as an upper cover.

The second fitting member 130 has a cylindrical first peripheral wall body 131 forming an inner wall, and a cylindrical second peripheral wall body 132 forming an outer wall (FIGS. 14 and 15). The first peripheral wall body 131 and the second peripheral wall body 132 are formed by arranging and connecting a plurality of flat plate-like wall bodies, the numbers of which are the same, in a circumferential direction, respectively. The second fitting member 130 is a double-walled structure in which the first peripheral wall body 131 and the second peripheral wall body 132 are disposed with the cylinder axial directions aligned in the same direction. The wall bodies of each of the first peripheral wall body 131 and the second peripheral wall body 132 are disposed opposite to each other at an interval. Therefore, in the second fitting member 130, a space having a cylindrical shape (hereinafter, referred to as a "cylindrical space") 133 is formed between the first peripheral wall body 131 and the second peripheral wall body 132 (FIGS. 14 and 15). Further, in the second fitting member 130, one or a plurality of accommodation chambers is formed inside the first peripheral wall body 131, and the electronic components and the electric wires We are accommodated in the accommodation chambers.

The first peripheral wall body 131 has two openings 131a and 131b disposed opposite to each other (FIGS. 14 and 15). In addition, the second peripheral wall body 132 has two openings 132a and 132b disposed opposite to each other (FIGS. 14 and 15). In the second fitting member 130, a peripheral edge portion (hereinafter, referred to as an "opening peripheral edge portion") 131c of one opening 131a in the first peripheral wall body 131, and a peripheral edge portion (hereinafter, referred to as an "opening peripheral edge portion") 132c of one opening 132a in the second peripheral wall body 132 are disposed opposite to each other at an interval (FIG. 15). Therefore, in the second fitting member 130, one opening 131a in the first peripheral wall body 131, and an annular opening 134 between the respective one opening peripheral edge portions 131c and 132c serve as openings of the blockage target of the first fitting member 120 (FIG. 15). Further, in the second fitting member 130, a peripheral edge portion (hereinafter, referred to as an "opening peripheral edge portion") 131d of the other opening 131b in the first peripheral wall body 131, and a peripheral edge portion (hereinafter, referred to as an "opening peripheral edge portion") 132d of the other opening 132b in the second peripheral wall body 132 are disposed opposite to each other at an interval (FIG. 14). Accordingly, in the second fitting member 130, the other opening 131b in the first peripheral wall body 131, and an annular opening 135 between the respective other opening peripheral edge portions 131d and 132d serve as openings of the blockage target of the third fitting member 140 (FIG. 14).

The first fitting member 120 has a cylindrical peripheral wall body 121, and a closing body 122 which closes one opening of the peripheral wall body 121 (FIGS. 14 and 15). Here, the other opening of the peripheral wall body 121 is used as an opening 120a of the first fitting member 120 (FIG. 14). In the peripheral wall body 121, a plurality of flat plate-like wall bodies connected side by side in the circumferential direction is disposed to correspond to the plurality of flat plate-like wall bodies in the first peripheral wall body 131 and the second peripheral wall body 132. Therefore, in the first fitting member 120, the peripheral edge portion (hereinafter, referred to as an "opening peripheral edge portion") 121a (FIG. 14) of the opening 120a in the peripheral wall body 121 can be inserted and fitted into the cylindrical space 133 from the opening 134 of the second fitting member 130. The opening peripheral edge portion 121a is sandwiched between one opening peripheral edge portion 131c of the first peripheral wall body 131 and one opening peripheral edge portion 132c of the second peripheral wall body 132 in the second fitting member 130 along with the insertion fitting. In the first fitting member 120 and the second fitting member 130, in the fitted state, the inner wall surface of the opening peripheral edge portion 121a of the peripheral wall body 121 and the outer wall surface of one opening peripheral edge portion 131c of the first peripheral wall body 131 are disposed opposite to each other, and the outer wall surface of the opening peripheral edge portion 121a of the peripheral wall body 121 and the inner wall surface of the one opening peripheral edge portion 132c of the second peripheral wall body 132 are disposed opposite to each other.

The third fitting member 140 has a cylindrical peripheral wall body 141, and a closing body 142 that closes one opening of the peripheral wall body 141 (FIGS. 14 and 15). Here, the other opening of the peripheral wall body 141 is used as an opening 140a of the third fitting member 140 (FIG. 15). In the peripheral wall body 141, a plurality of flat plate-like wall bodies connected side by side in the circumferential direction is disposed to correspond to the plurality of flat plate-like wall bodies in the first peripheral wall body 131 and the second peripheral wall body 132. Therefore, in the third fitting member 140, the peripheral edge portion (hereinafter, referred to as an "opening peripheral edge portion") 141a (FIG. 15) of the opening 140a in the peripheral wall body 141 can be inserted and fitted into the cylindrical space 133 from the opening 135 of the second fitting member 130. The opening peripheral edge portion 141a is sandwiched between the other opening peripheral edge portion 131d of the first peripheral wall body 131 and the other opening peripheral edge portion 132d of the second peripheral wall body 132 in the second fitting member 130 along with the insertion fitting. In the third fitting member 140 and the second fitting member 130, in the fitted state, the inner wall surface of the opening peripheral edge portion 141a of the peripheral wall body 141 and the outer wall surface of the other opening peripheral edge portion 131d of the first peripheral wall body 131 are disposed opposite to each other, and the outer wall surface of the opening peripheral edge portion 141a of the peripheral wall body 141 and the inner wall surface of the other opening peripheral edge portion 132d of the second peripheral wall body 132 are disposed opposite to each other.

The housing 110 has a first lock structure 150 that holds the fitted state of the first and second fitting members 120 and 130, and a second lock structure 160 that holds the fitted state of the second and third fitting members 130 and 140 (FIGS. 13 to 15).

Here, the lock structure 1 illustrated above is applied to the first lock structure 150. In the first lock structure 150 (the lock structure 1), the engaged body 10 is provided on the first fitting member 120, and the engaging body 20 is provided on the second fitting member 130.

The engaged body 10 is provided on the outer wall surface side of the peripheral wall body 121 in the first fitting member 120 (FIGS. 14 and 15). In the first fitting member 120 of this example, the engaged body 10 is provided at four locations on the outer wall surface side of the peripheral wall body 121.

Specifically, the engaged body 10 forms the first engaged wall 13, using a part of peripheral wall body 121 in the first fitting member 120 (FIG. 14). Therefore, the outer wall surface 13a of the first engaged wall 13 is disposed on the same plane as the inner wall surface of the peripheral wall body 121. The engaged body 10 is provided on the opening peripheral edge portion 121a of the peripheral wall body 121. Further, the engaged body 10 makes all or a part of the first engaged wall 13 protrude to the insertion direction side of the end surface of the opening peripheral edge portion 121a of the peripheral wall body 121 with respect to the engaging body 20, thereby disposing at least the end portion 11a of the engaged main body 11 and the first communication port 17a on the insertion direction side of the end surface of the opening peripheral edge portion 121a with respect to the engaging body 20. The engaged body 10 of this example disposes the engaged protrusion 12 and the drainage space 17 on the insertion direction side of the end surface of the opening peripheral edge portion 121a with respect to the engaging body 20.

The engaging body 20 is provided on the first peripheral wall body 131 and the second peripheral wall body 132 of the second fitting member 130 (FIGS. 14 and 15). In the second fitting member 130 of this example, the engaging bodies 20 are provided at four locations of the first peripheral wall body 131 and the second peripheral wall body 132 disposed opposite to each other.

Specifically, the engaging body 20 forms the first engaging wall 23, using a part of the first peripheral wall body 131, and forms the second engaging wall 24, using a part of the second peripheral wall body 132 (FIG. 15). Therefore, the inner wall surface 23a of the first engaging wall 23 is disposed on the same plane as the outer wall surface of the first peripheral wall body 131. On the other hand, the second engaging wall 24 of this example is disposed on the second peripheral wall body 132 as if the second engaging wall 24 bulges to the side opposite to the first peripheral wall body 131 side. Similarly, the first covering wall 28a of this example is disposed on the second peripheral wall body 132 to bulge to the side opposite to the first peripheral wall body 131 side. The engaging body 20 is provided between the opening peripheral edge portion 131c of the first peripheral wall body 131 and the opening peripheral edge portion 132c of the second peripheral wall body 132. The engaging body 20 is disposed at a position at which it does not protrude from the end surfaces of the opening peripheral edge portions 131c and 132c. In the second fitting member 130, the third engaging wall 25, the fourth engaging wall 26, and the second covering wall 28b are provided as connecting walls that connect the first peripheral wall body 131 and the second peripheral wall body 132 to each other.

In the housing 110, since the first lock structure 150 (the lock structure 1) is provided as described above, the gap G2 between the outer wall surface 13a of the first engaged wall 13 and the inner wall surface 23a of the first engaging wall 23 is formed as a part of the gap between the inner wall surface of the peripheral wall body 121 and the outer wall surface of the first peripheral wall body 131. Therefore, in the housing 110, the gap G2 is connected to the inner accommodation chamber. However, as described above, the first lock structure 150 (the lock structure 1) can suppress the entry of the liquid W into the gap between the engaged body 10 and the engaging body 20 connected to the inner accommodation chamber of the housing 110. Thus, even if the liquid W enters the gap, it is possible to suppress the entry of the liquid W into the gap G2 directly connected to the accommodation chamber and to reduce the amount of the liquid W entering the gap G2. Therefore, the housing 110 can suppress the entry of the liquid W into the inner accommodation chamber.

Further, in the housing 110, the first protruding wall 18a and the second protruding wall 18b of the engaged body 10 are connected to the opening peripheral edge portion 121a of the peripheral wall body 121, respectively. Therefore, the housing 110 can suppress the entry of the liquid W into the gap between the inner wall surface of the peripheral wall body 121 and the outer wall surface of the first peripheral wall body 131 around the engaged body 10.

Furthermore, in the engaged body 10 of this example, the first protruding wall 18a and the second protruding wall 18b are connected to the opening peripheral edge portion 121a of the peripheral wall body 121 on the same plane. Further, the rib-like protrusion 123 is provided on the outer wall surface of the opening peripheral edge portion 121a. In the opening peripheral edge portion 121a, the protrusion 123 is provided at a position except the arrangement location of the engaged body 10, and the protrusion 123 is connected to the third engaged wall 15 and the fourth engaged wall 16 in an orthogonal state. Therefore, in the housing 110, a labyrinth structure provided by the opening peripheral edge portion 121a of the peripheral wall body 121, the protrusion 123, and one opening peripheral edge portion 131c of the first peripheral wall body 131 is also formed around the first lock structure 150 (the lock structure 1). Therefore, the housing 110 can also suppress the entry of the liquid W into the inner accommodation chamber from this point.

Further, the same lock structure 1 as the first lock structure 150 or a structure different from the lock structure 1 may be applied to the second lock structure 160. The second lock structure 160 of this example includes an engaged body 161 provided on the third fitting member 140, and an engaging body 162 which is provided on the second fitting member 130, capable of inserting and removing the engaged body 161 along the insertion and removal directions opposite to each other, and capable of locking the inserted engaged body 161 in the insertion direction and the removal direction, respectively (FIGS. 13 to 15). The second lock structure 160 is formed, for example, to hook the claws of each of the engaged body 161 and the engaging body 162, thereby locking the relative movement between the engaged body

161 and the engaging body 162 to the removal direction side, when the second fitting member 130 and the third fitting member 140 are in the fitted state. Further, the second lock structure 160 is formed, for example, to lock the relative movement between the engaged body 161 and the engaging body 162 to the insertion direction side, by bringing the engaged body 161 and the engaging body 162 into contact with each other so that the insertion of the engaged body 161 into the engaging body 162 does not further progress, when the second fitting member 130 and the third fitting member 140 are in the fitted state.

As described above, the lock structure 1, the electric connection box 100, and the wire harness WH of the present embodiment can suppress the entry of the liquid W into the inner accommodation chamber of the housing 110. Therefore, since the lock structure 1, the electric connection box 100, and the wire harness WH can suppress the performance deterioration associated with the entry of the liquid W with respect to the electronic components and the like stored in the accommodation chamber, it is possible to improve the durability.

In the lock structure according to the present embodiment, even if the liquid enters an accommodation space from a communication port, a locking hole, or the like and the liquid having entered is guided to an end portion in an insertion direction of the engaged main body, the liquid can be introduced into a drainage space from a first communication port and discharged outward from a second communication port. Therefore, since the lock structure can suppress the entry of the liquid into the gap between the engaged body and the engaging body connected to the internal spaces of the first and second fitting members, it is possible to suppress the entry of the liquid into the internal spaces of the first and second fitting members passing through the gap. Further, the electric connection box and the wire harness according to the present invention have the lock structure thereof, and the same effect as that of the lock structure can be obtained.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A lock structure comprising:
an engaged body; and
an engaging body capable of inserting and removing the engaged body along insertion and removal directions opposite to each other, and capable of locking the inserted engaged body in the insertion direction and the removal direction, respectively, wherein
the engaged body includes first and second engaged walls disposed opposite to each other at an interval in an orthogonal direction to the insertion and removal directions, third and fourth engaged walls disposed opposite to each other at an interval in an orthogonal direction to the insertion and removal directions and an opposite arrangement direction of the first and second engaged walls, a drainage space surrounded by respective inner wall surfaces of the first to fourth engaged walls, an engaged protrusion protruding from an outer wall surface of the second engaged wall, a first communication port through which the drainage space communicates with the outside on the insertion direction side of the engaged protrusion, and a second communication port through which the drainage space communicates with the outside on the removal direction side of the first communication port, and the engaging body includes first and second engaging walls disposed opposite to each other at an interval in the opposite arrangement direction, third and fourth engaging walls disposed opposite to each other at an interval in the orthogonal direction to the insertion and removal directions and the opposite arrangement direction, an accommodation space that is an internal space surrounded by respective inner wall surfaces of the first to fourth engaging walls and in which the engaged body is accommodated, an insertion port through which the engaged body is inserted into the accommodation space from a tip of an end portion on the insertion direction side, a locking hole that is a penetration hole provided in the second engaging wall and into which the engaged protrusion is inserted when the engaged body is accommodated in the accommodation space, and a communication port through which the accommodation space communicates with the outside on the insertion direction side of the locking hole.

2. The lock structure according to claim 1, wherein the locking hole is a penetration hole connected to the communication port.

3. The lock structure according to claim 2, wherein the first communication port and the second communication port are disposed opposite to each other in the insertion and removal directions.

4. The lock structure according to claim 3, wherein the engaged body is provided on an outer wall surface side of a peripheral wall body of a first fitting member, and forms the first engaged wall, using a part of the peripheral wall body of the first fitting member, and
the engaging body is provided on a first peripheral wall body and a second peripheral wall body of a second fitting member sandwiching an opening peripheral edge portion of the peripheral wall body of the first fitting member, forms the first engaging wall, using a part of the first peripheral wall body having an opening peripheral edge portion disposed opposite to the inner wall surface of the opening peripheral edge portion of the peripheral wall body, and forms the second engaging wall, using a part of the second peripheral wall body having an opening peripheral edge portion disposed opposite to the outer wall surface of the opening peripheral edge portion of the peripheral wall body.

5. The lock structure according to claim 2, wherein the engaged body is provided on an outer wall surface side of a peripheral wall body of a first fitting member, and forms the first engaged wall, using a part of the peripheral wall body of the first fitting member, and
the engaging body is provided on a first peripheral wall body and a second peripheral wall body of a second fitting member sandwiching an opening peripheral edge portion of the peripheral wall body of the first fitting member, forms the first engaging wall, using a part of the first peripheral wall body having an opening peripheral edge portion disposed opposite to the inner wall surface of the opening peripheral edge portion of the peripheral wall body, and forms the second engaging wall, using a part of the second peripheral wall body having an opening peripheral edge portion disposed opposite to the outer wall surface of the opening peripheral edge portion of the peripheral wall body.

6. The lock structure according to claim 1, wherein
the first communication port and the second communication port are disposed opposite to each other in the insertion and removal directions.
7. The lock structure according to claim 6, wherein
the engaged body is provided on an outer wall surface side of a peripheral wall body of a first fitting member, and forms the first engaged wall, using a part of the peripheral wall body of the first fitting member, and
the engaging body is provided on a first peripheral wall body and a second peripheral wall body of a second fitting member sandwiching an opening peripheral edge portion of the peripheral wall body of the first fitting member, forms the first engaging wall, using a part of the first peripheral wall body having an opening peripheral edge portion disposed opposite to the inner wall surface of the opening peripheral edge portion of the peripheral wall body, and forms the second engaging wall, using a part of the second peripheral wall body having an opening peripheral edge portion disposed opposite to the outer wall surface of the opening peripheral edge portion of the peripheral wall body.
8. The lock structure according to claim 1, wherein
the engaged body is provided on an outer wall surface side of a peripheral wall body of a first fitting member, and forms the first engaged wall, using a part of the peripheral wall body of the first fitting member, and
the engaging body is provided on a first peripheral wall body and a second peripheral wall body of a second fitting member sandwiching an opening peripheral edge portion of the peripheral wall body of the first fitting member, forms the first engaging wall, using a part of the first peripheral wall body having an opening peripheral edge portion disposed opposite to the inner wall surface of the opening peripheral edge portion of the peripheral wall body, and forms the second engaging wall, using a part of the second peripheral wall body having an opening peripheral edge portion disposed opposite to the outer wall surface of the opening peripheral edge portion of the peripheral wall body.
9. An electric connection box comprising:
a housing configured to accommodate electronic components in the housing, wherein
the housing has at least first and second fitting members to be fitted to each other, and has a lock structure configured to hold a fitted state of the first and second fitting members,
the lock structure includes an engaged body provided on the first fitting member, and an engaging body provided on the second fitting member, capable of inserting and removing the engaged body along insertion and removal directions opposite to each other, and capable of locking the inserted engaged body in the insertion direction and the removal direction, respectively,
the engaged body includes first and second engaged walls disposed opposite to each other at an interval in an orthogonal direction to the insertion and removal directions, third and fourth engaged walls disposed opposite to each other at an interval in an orthogonal direction to the insertion and removal directions and an opposite arrangement direction of the first and second engaged walls, a drainage space surrounded by respective inner wall surfaces of the first to fourth engaged walls, an engaged protrusion protruding from an outer wall surface of the second engaged wall, a first communication port through which the drainage space communicates with the outside on the insertion direction side of the engaged protrusion, and a second communication port through which the drainage space communicates with the outside on the removal direction side of the first communication port, and the engaging body includes first and second engaging walls disposed opposite to each other at an interval in the opposite arrangement direction, third and fourth engaging walls disposed opposite to each other at an interval in the orthogonal direction to the insertion and removal directions and the opposite arrangement direction, an accommodation space which is an internal space surrounded by respective inner wall surfaces of the first to fourth engaging walls and in which the engaged body is accommodated, an insertion port through which the engaged body is inserted into the accommodation space from a tip of an end portion on the insertion direction side, a locking hole which is a penetration hole provided in the second engaging wall and into which the engaged protrusion is inserted when the engaged body is accommodated in the accommodation space, and a communication port through which the accommodation space communicates with the outside on the insertion direction side of the locking hole.
10. A wire harness comprising:
an electronic component;
an electric wire electrically connected to the electronic component; and
a housing configured to accommodate the electronic component and the electric wire inside and draws the electric wire outward from inside, wherein
the housing has at least first and second fitting members to be fitted to each other, and has a lock structure configured to hold a fitted state of the first and second fitting members,
the lock structure includes an engaged body provided on the first fitting member, and an engaging body provided on the second fitting member, capable of inserting and removing the engaged body along insertion and removal directions opposite to each other, and capable of locking the inserted engaged body in the insertion direction and the removal direction, respectively,
the engaged body includes first and second engaged walls disposed opposite to each other at an interval in an orthogonal direction to the insertion and removal directions, third and fourth engaged walls disposed opposite to each other at an interval in an orthogonal direction to the insertion and removal directions and an opposite arrangement direction of the first and second engaged walls, a drainage space surrounded by respective inner wall surfaces of the first to fourth engaged walls, an engaged protrusion protruding from an outer wall surface of the second engaged wall, a first communication port through which the drainage space communicates with the outside on the insertion direction side of the engaged protrusion, and a second communication port through which the drainage space communicates with the outside on the removal direction side of the first communication port, and
the engaging body includes first and second engaging walls disposed opposite to each other at an interval in the opposite arrangement direction, third and fourth engaging walls disposed opposite to each other at an interval in the orthogonal direction to the insertion and removal directions and the opposite arrangement direction, an accommodation space that is an internal space surrounded by respective inner wall surfaces of the first to fourth engaging walls and in which the engaged body is accommodated, an insertion port through which the engaged body is inserted into the accommodation space from a tip of an end portion on the insertion direction side, a locking hole that is a penetration hole provided in the second engaging wall and into which the engaged protrusion is inserted when the engaged body is accommodated in the accommodation space, and a communication port through which the accommodation space communicates with the outside on the insertion direction side of the locking hole.

* * * * *